(12) United States Patent
Tsubaki et al.

(10) Patent No.: US 7,813,248 B2
(45) Date of Patent: Oct. 12, 2010

(54) METHOD AND APPARATUS FOR PROTECTING DATA WHEN A RECORDING PROCESS HAS FAILED

(75) Inventors: Masami Tsubaki, Kanagawa (JP);
Nobuhiro Sakai, Kanagawa (JP);
Takashi Furukawa, Kanagawa (JP);
Motohiro Terao, Kanagawa (JP)

(73) Assignee: Sony Corporation, Tokyo (JP)

( * ) Notice: Subject to any disclaimer, the term of this patent is extended or adjusted under 35 U.S.C. 154(b) by 1708 days.

(21) Appl. No.: 11/006,156

(22) Filed: Dec. 7, 2004

(65) Prior Publication Data

US 2005/0149579 A1 Jul. 7, 2005

(30) Foreign Application Priority Data

Dec. 9, 2003 (JP) ............................. 2003-409889

(51) Int. Cl.
*G11B 7/0045* (2006.01)
(52) U.S. Cl. .................................. 369/59.25
(58) Field of Classification Search ........................ None
See application file for complete search history.

(56) References Cited

U.S. PATENT DOCUMENTS

| | | | | |
|---|---|---|---|---|
| 4,733,386 A | * | 3/1988 | Shimoi | 369/53.21 |
| 5,831,950 A | * | 11/1998 | Furukawa | 369/53.31 |
| 6,842,580 B1 | * | 1/2005 | Ueda et al. | 386/125 |
| 2004/0013059 A1 | * | 1/2004 | Sasaki et al. | 369/47.12 |
| 2005/0157598 A1 | * | 7/2005 | Takakuwa et al. | 369/30.03 |

FOREIGN PATENT DOCUMENTS

| | | |
|---|---|---|
| EP | 1 158 516 A2 | 11/2001 |
| EP | 1 426 963 A2 | 6/2004 |
| EP | 1 526 543 A1 | 4/2005 |
| JP | 7 296560 | 11/1995 |
| JP | 2000 149425 | 5/2000 |
| JP | 2003 151216 | 5/2003 |
| JP | 2003 169293 | 6/2003 |
| WO | WO 01/35406 A1 | 5/2001 |

OTHER PUBLICATIONS

Apr. 13, 2010 Communication from the European Patent Office.

* cited by examiner

*Primary Examiner*—Peter Vincent Agustin
(74) *Attorney, Agent, or Firm*—Frommer Lawrence & Haug LLP; William S. Frommer; Ellen Marcie Emas

(57) ABSTRACT

When a data recording process fails to normally complete on an information recording medium, for example, because of a power interruption, a record controlling apparatus resumes recording immediately when power is turned back on, while protecting data that was recorded prior to the power interruption. The record controlling apparatus acquires, from a file system, a list of files that underwent a simple-salvage process, generates a tentative file name unfound in the list, and then generates a file with that tentative file name having, as the content thereof, data recorded in an area indicated by a new allocation area allocation descriptor contained in backup information in a backup memory. The file system that is updated with the generated file is recorded onto an optical disk as the information recording medium. The backup information is then deleted from the backup memory. The record controlling apparatus finds applications in video cameras, video recorders, etc., each of which uses an information recording medium with a file thereof managed by a file system.

10 Claims, 23 Drawing Sheets

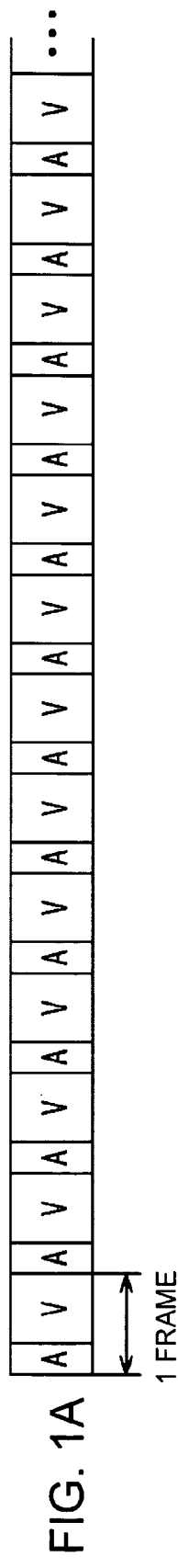
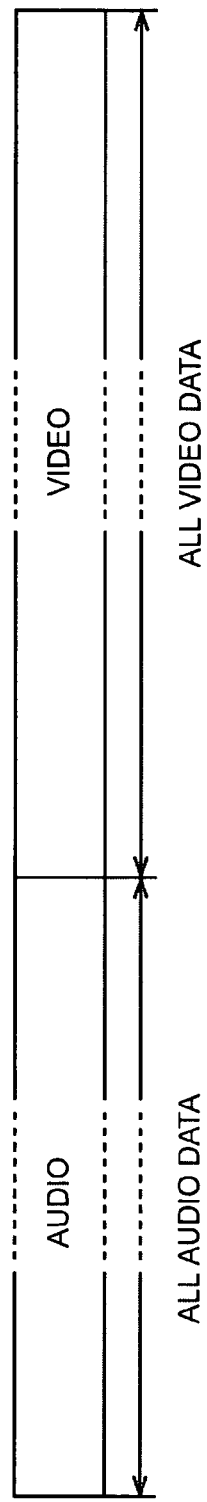
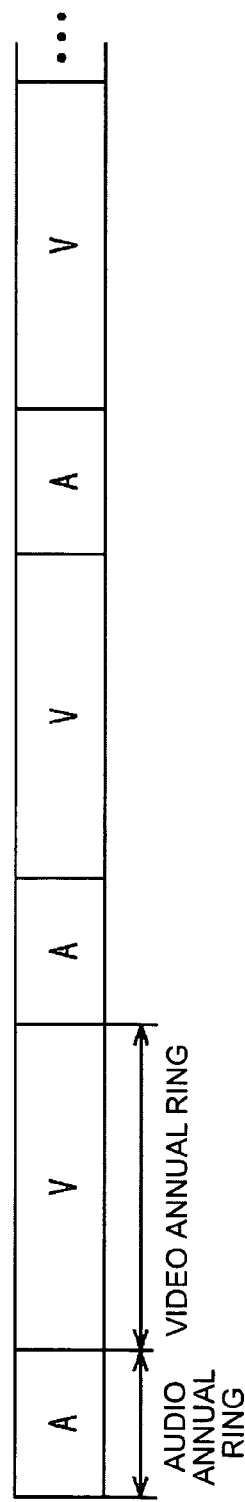
FIG. 1

FIG. 4

| CATEGORY | SUB-CATEGORY | NAME | UPDATE TYPE | SIZE |
|---|---|---|---|---|
| STORAGE DATA | SALVAGE MARKER MANAGEMENT DATA | SALVAGE MARKER ID | — | 16 BYTES/MARKER |
| | | SALVAGE MARKER Inc. No. | — | 4 BYTES/MARKER |
| | | DATE AND TIME OF RECORDING | — | 12 BYTES/MARKER |
| | | NEXT SALVAGE MARKER POINTER (LBA OF ATA) | — | 4 BYTES/MARKER |
| | | UMID | — | 16 BYTES/MARKER |
| | | MANAGEMENT DATA HEADER | — | 16 BYTES?/DATA TYPE |
| | FILE DATA | PROGRAM META | OVERWRITING | 7 BYTES/FILE AT MAX. |
| | | ADD-ON RECORDED INDEX FILE (INTERNAL FORMAT) | OVERWRITING | 1K BYTES/CLIP AT MAX. |
| | | CLIP INFO (INTERNAL FORMAT) | OVERWRITING | 1K BYTES/CLIP AT MAX. |
| | | NRT (NON REAL TIME) META | ADD-ON RECORDING | 1K BYTES/ANNUAL RING |
| | FS MANAGEMENT DATA | UDF FE (FILE ENTRY) | OVERWRITING | ? |
| | | UDF AD (ALLOCATION DESCRIPTOR) | ADD-ON RECORDING | 8 BYTES/AD |
| | | DEFECT LIST | ADD-ON RECORDING | 4 BYTES/DEFECT |

FIG. 9

| CATEGORY | SUBCATEGORY | NAME | UPDATE TYPE | SIZE |
|---|---|---|---|---|
| STORAGE DATA | BACKUP MEMORY MANAGEMENT DATA | DATE AND TIME OF RECORDING | — | 12 BYTES |
| | | INDEX ID (INDEX FILE ELEMENT) | — | 16 BYTES |
| | | STORAGE DATA HEADER | — | 16 BYTES/DATA TYPE |
| | FS MANAGEMENT DATA | NEW ALLOCATION AREA AD (ALLOCATION DESCRIPTOR) | ADD-ON RECORDING OR OVERWRITING | 8 BYTES/AD |
| | | DEFECT LIST | ADD-ON RECORDING | 4 BYTES/DEFECT |

FIG. 11

BACKUP INFORMATION: NONE

EMPTY

USED

EMPTY

USED

METHOD AND APPARATUS FOR PROTECTING DATA WHEN A RECORDING PROCESS HAS FAILED

BACKGROUND OF THE INVENTION

1. Field of the Invention

The present invention is directed to a method and apparatus for controlling data recording, a recording medium, and a computer program. In particular, the present invention is directed to a method and apparatus for controlling data recording, a recording medium, and a computer program for protecting data even when a recording process of the data has failed to normally complete on a random-access information recording medium.

2. Description of the Related Art

Magnetic tapes and optical disks are known as an information recording medium for recording video captured by a digital video camera. When data of a captured video and a collected audio (hereinafter a combination of video data and audio data is referred to AV (audio-visual) data) is recorded on the information recording medium, such as an optical disk that manages the AV data using a file system, video and audio are more quickly played from a desired location of the medium than on the magnetic tape.

The file system is recorded onto the optical disk subsequent to the completion of the recording of the AV data. The file system contains a file name of the AV data, and information about a recording position of the AV data on the optical disk.

The data recorded on the optical disk is managed according to the file system. For example, when the optical disk is played, a player acquires a file name of at least one file recorded on the optical disk, and a recording position of each file on the optical disk by referencing the file system recorded on the optical disk. When a user requests the player to play a desired file, the player identifies the recording position of the requested file, and reads the AV data from the recording position to play the AV data in accordance with the file system. The recording position is not necessarily collected at one location, and can be dispersed among a plurality of locations. In such a case, a plurality of dispersed locations corresponding to a single file are all recorded in the file system. Even when a file of data dispersed at a plurality of recording positions is played, all data dispersed is read.

If a power interruption takes place, for example, due to an erroneous battery removal, in the middle of the recording of the AV data onto an optical disk using a known recording apparatus, such as a digital video camera, the recording of the file system corresponding to the recorded AV data is terminated in an incomplete state thereof. If the playing of the optical disk is attempted when power is turned back on, the AV data is not recognized because of the absence of the corresponding file system. The playing of the AV data is thus difficult.

In order to recover the file system after the restoration of power even if the recording of the file system is incomplete due to the power interruption, information for restoring the file system is recorded onto the optical disk each time a single piece of AV data is recorded. When the power is turned back on, the file system is recovered based on the information. The AV data that was recorded until the power interruption can thus be played. Japanese Unexamined Patent Application Publication No. 10-177769 discloses such a technique.

In accordance with the disclosed technique, however, it takes substantial time to recover the file system based on the information after a power restoration. It is difficult to resume recording immediately subsequent to the power restoration without missing AV data recorded until the power interruption.

For example, should a battery be removed accidentally from a digital video camera for business use incorporating the above-referenced technique, a file system corresponding to AV data recorded heretofore could be unrecorded. When a battery is loaded again, a file system recovery process is performed to allow the AV data recorded until the recording interruption to be played. Since the recovery process of the file system takes substantial time, a photographer can miss an opportunity to photograph an important scene.

Such a recording interruption could take place in the recording of data other than the AV data.

SUMMARY OF THE INVENTION

Accordingly, it is an object of the present invention to provide a record controlling apparatus that resumes recording immediately while protecting recorded data when power is turned back on after a power failure at which a data recording process failed to normally complete.

According to a first aspect of the present invention, a record controlling apparatus includes a unit for controlling writing to the information recording medium, a unit for holding information representing an area on the information recording medium on which a write unit performs a write operation, a unit for determining whether the write unit has normally completed the write operation, and a generation control unit for controlling generating a file occupying the area on the information recording medium corresponding to the information held by the holding unit if the determining unit determines that the write unit has failed to normally complete the write operation.

The generation control unit may include a generator for generating identification information of the file containing data written onto the area on the information recording medium corresponding to the information held in the holding unit if the determining unit determines that the write unit has failed to normally complete the write operation, and a register device for registering both the identification information of the file generated by the generator and a recording position on the information recording medium in the file system written on the information recording medium.

When power is turned back on with the information recording medium in a loaded state thereof or when the information recording medium is loaded in a power-on state, the determining unit may determine whether the write unit has normally completed the write operation.

The determining unit may determine whether the write unit has normally completed the write operation, based on a determination of whether the file system is updated in response to the file that has been written on the information recording medium by the write unit.

The determining unit may determine whether the write unit has normally completed the write operation, based a flag that represents whether the record of the data on the file system is closed.

The apparatus may further include a unit for reserving a space available in the information recording medium, wherein the holding unit holds information representing the available space on the information recording medium reserved by the reserving unit.

The write unit may write information for updating the file system in response to a predetermined amount of data each time the predetermined amount of data is written in the available space reserved by the reserving unit.

According to a second aspect of the present invention, a record control method includes the steps of controlling writing to the information recording medium, holding information representing an area on the information recording medium on which the write unit performs a write operation, determining whether the write unit has normally completed the write operation, and controlling generating a file occupying the area on the information recording medium corresponding to the information held by the holding unit if the determining unit determines that the write unit has failed to normally complete the write operation.

The present invention in a third aspect is directed to a recording medium storing a computer-executable program. The computer-executable program includes program codes for performing the steps of controlling writing to the information recording medium, holding information representing an area on the information recording medium on which the write unit performs a write operation, determining whether the write unit has normally completed the write operation, and controlling generating a file occupying the area on the information recording medium corresponding to the information held by the holding unit if the determining unit determines that the write unit has failed to normally complete the write operation.

The present invention in a fourth aspect is directed to a computer-executable program. The computer executable program includes program codes for performing the steps of controlling writing to the information recording medium, holding information representing an area on the information recording medium on which the write unit performs a write operation, determining whether the write unit has normally completed the write operation, and controlling generating a file occupying the area on the information recording medium corresponding to the information held by the holding unit if the determining unit determines that the write unit has failed to normally complete the write operation.

In accordance with embodiments of the present invention, the write operation to the information recording medium is controlled so that the information indicating the area on the information recording medium on which the write unit performs the write operation is held. The determining unit determines whether the write unit has normally completed the write operation. If the determining unit determines that the write unit has failed to normally complete the write operation, the record controlling apparatus controls generating the file occupying the area on the information recording medium corresponding to the held information indicating the area on the information recording medium on which the write unit performs the write operation.

Even if the recording operation is not normally completed on the information recording medium, managing the data using the file system, due to a power interruption or the like, the record controlling apparatus quickly resumes recording while protecting the data recorded heretofore immediately when power is turned back on.

BRIEF DESCRIPTION OF THE DRAWINGS

FIGS. 1A-1C roughly illustrate the record of annual ring data (AV data) of an optical disk;

FIG. 4 is a table listing information contained in the salvage marker;

FIG. 9 is a table listing information contained in backup information;

FIG. 11 illustrates the recording process of the recording and reproducing apparatus of FIG. 8;

DESCRIPTION OF THE PREFERRED EMBODIMENTS

Figure 2:
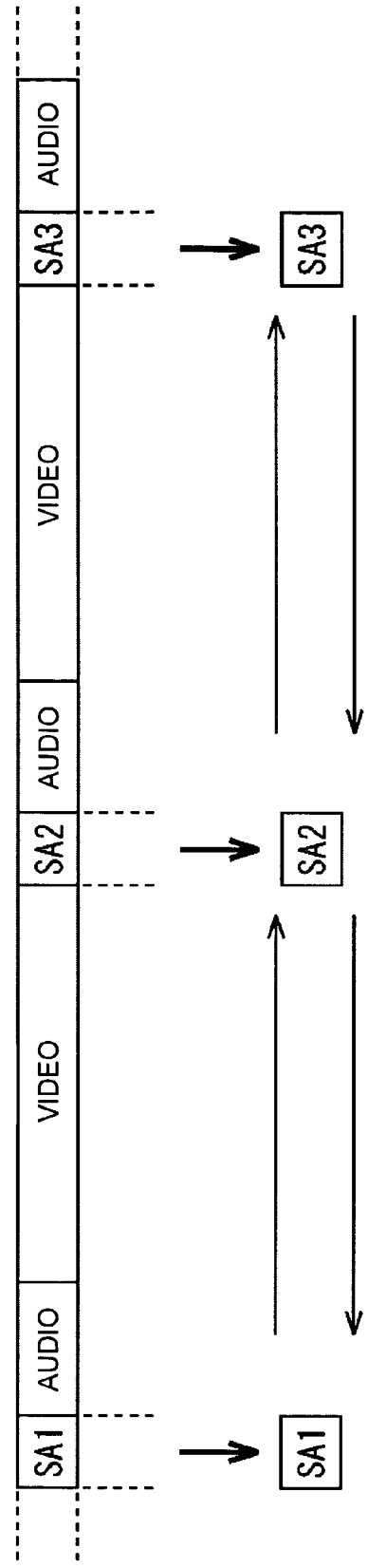
FIG. 2 illustrates the record order of salvage markers and annual ring data recorded onto the optical disk.

A record controlling apparatus (for example, a recording and reproducing apparatus 100 of FIG. 8) of the present invention includes a unit (for example, a controller 120 of FIG. 8 for performing a process in step S3 of FIG. 10) for controlling writing to an information recording medium (such as an optical disk), a unit (a non-volatile memory 133 of FIG. 8 for performing a process in step S2 of FIG. 10) for holding information representing an area on the information recording medium on which a write unit performs a write operation, a unit (the controller 120 of FIG. 8 for performing a process in step S42 of FIG. 20) for determining whether the write unit has normally completed the write operation, and a generation control unit (the controller 120 of FIG. 8 for performing a process in step S44 of FIG. 10) for controlling generating a file occupying the area on the information recording medium corresponding to the information held by the holding unit if the determining unit determines that the write unit has failed to normally complete the write operation.

The generation control unit includes a generator (the controller 120 of FIG. 8 for performing a process in step S62 of FIG. 21) for generating identification information of the file containing data written onto the area on the information recording medium corresponding to the information held in the holding unit if the determining unit determines that the write unit has failed to normally complete the write operation, and a register device (the controller 120 of FIG. 8 for performing a process in step S63 of FIG. 21) for registering both the identification information (for example, a file name) of the file generated by the generator and a recording position on the information recording medium in the file system (for example, universal disk format (UDF)) written on the information recording medium.

The determining unit determines whether the write unit has normally completed the write operation, based a flag (logical volume integrity descriptor (LVID) of UDF) that represents whether the record of the data on the file system is closed.

The apparatus of the present invention further includes a unit (for example, an allocation manager 132 of FIG. 8 for performing a process in step S1 of FIG. 10) for reserving a space available in the information recording medium, wherein the holding unit holds information representing the available space on the information recording medium reserved by the reserving unit.

The write unit write information (for example, a salvage marker of FIG. 2) for updating the file system in response to a predetermined amount of data each time the predetermined amount of data is written in the available space reserved by the reserving unit.

A record control method of the present invention includes a step (for example, step S3 of FIG. 10) for controlling writing to the information recording medium, a step (for example, step S2 of FIG. 10) for holding information representing an area on the information recording medium on which the write unit performs a write operation, a step (for example, step S42 of FIG. 20) for determining whether the write unit has normally completed the write operation, and a step (for example, step S44 of FIG. 20) for controlling generating a file occupying the area on the information recording medium corresponding to the information held by the holding unit if the determining unit determines that the write unit has failed to normally complete the write operation.

The correspondence between elements in the computer-executable program and the recording medium storing the computer-executable program and specific components corresponding thereto in the embodiments of the present invention remains unchanged from the one discussed in connection with the above-referenced record control method, and is omitted here.

The embodiments of the present invention are described below. A recording and reproducing apparatus records markers between data when the data, such as video and music, managed as a file on the recording medium is recorded on the recording medium. If a recording process fails to normally complete, namely, if the data recorded on the recording medium is not registered as one file in the file system, the recording and reproducing apparatus identifies a recording position of the data recorded prior to an interruption of the recording process on the recording medium. Based on the recording position, the recording and reproducing apparatus registers the data as a file in the file system. Even if the recording process fails to normally complete, the data recorded on the recording medium until the recording process is interrupted is recognized as one file, and is thus playable. This series of processes is referred to as a full salvage. The marker interleaved between data is referred to as a salvage marker.

If the file system complies with a universal disk format (UDF), a logical volume integrity descriptor (LVID) of the UDF recorded on the optical disk is referenced to determine whether the file system has been normally recorded on the optical disk.

The LVID is a flag that represents whether a file recorded on the optical disk is normally closed. If the file system is normally recorded with the file normally closed, a closed flag is set in the LVID. If the file system is not normally recorded with the file not normally closed, an open flag is set in the LVID.

The recording of the AV data on the optical disk is described with reference to FIGS. 1A-1C.

As shown in FIG. 1A, video data V and audio data A accompanying the video data V are alternately arranged in each frame. This recording method is referred to as a frame-by-frame interleave method.

As shown in FIG. 1B, all series of video data and all series of audio data are arranged as respective single files. This method is hereinafter referred to as a non-interleave method.

As shown in FIG. 1C, vide data longer than one frame but not long enough to cover all series of video data alternates with audio data longer than one frame but not long enough to cover all series of audio data.

In this way, the video data V longer than one frame but not the entirety thereof and the audio data A longer than one frame but not the entirety thereof are successively recorded from an inner circle to an outer circuit or vice versa. If a record portion of the video data V and a record portion of the audio data were shaded or colored according to data density, the result would look like an annual ring of a tree trunk. Hereinafter, the video data A longer in size than one frame but not in the entirety thereof and the audio data A longer than one frame but not in the entirety thereof are referred to as annual ring data. As shown in FIG. 1C, a data sequence of video data V and audio data A periodically arranged by annual ring is recorded. Hereinafter, this recording method is referred to as annual ring interleave method.

In the frame-by-frame interleave method shown in FIG. 1A, one frame of video data V and audio data A is successively written onto the optical disk. The recording of data is performed by a buffer that is capable of buffering one frame of video data V and audio data A. Such buffer storing one frame of video data V and audio data A results in a short record delay in buffering.

In the frame-by-frame interleave method, one frame of video data V and audio data A is successively recorded on the optical disk. When one of video and audio is edited, in other words, AV (audio-video) split editing is performed, both the video data V and the audio data A are read. It is difficult to efficiently read data from the optical disk.

For example, when video only is edited, it is sufficient to read the video data V only. When the video data V is read from an optical disk having the video data V and the audio data A recorded in the frame-by-frame interleave method, a seek operation to a recording position of the video data V of a next frame is performed and then the video data V is read. This sequence must be repeated. In the frame-by-frame interleave method, the audio data A of one frame is recorded between the recording position of the video data V in the frame and the recording position of the video data V in the next frame. The time required to read a small amount of audio data A is typically shorter than the time required to perform the seek operation with the reading of the audio data A skipped. Overall time required to read both the video data V and the audio data A is shorter than the time required to read the video data V only. However, reading the video data V together with the audio data A not of interest is far from efficient reading.

In the non-interleave method of FIG. 1B, the entire sequence of video data and the entire sequence of audio data are separately arranged and recorded onto the optical disk. When the AV split editing is performed, one of the video data V and the audio data A whichever is of interest is thus efficiently read.

Since the entire sequence of video data V and the entire sequence of audio data A are separately arranged and recorded onto the optical disk in the non-interleave method, the recording area of the optical disk is divided into a video area and an audio area. The video data V is recorded onto the video area and the audio data A is recorded onto the audio area. If data is written onto the optical disk from an inner circle to an outer circle in a single stroke, a buffer having a size enough to store the entire sequence of video data or the entire sequence of audio data is required. With such a large-capacity buffer, a delay time involved in the buffering of the video data V or the audio data A becomes substantially long.

In one of non-interleave methods, the writing of the video data onto the video area and the writing of the audio data onto the audio data are performed in a time-division manner.

In such a case, a pickup device (not shown) of a disk drive (not shown) frequently performs seek operations to move from the video area to the audio area on the optical disk, and from the audio area to the video area, thereby substantially reducing an effective recording rate. If the recording and reproducing apparatus is a digital video camera, the frequency of seek operations is preferably reduced from the mechanical impact standpoint.

In the annual ring interleave method of FIG. 1C, the video data V and the audio data A are alternately arranged and recorded by annual ring on the optical disk. The annual ring data is longer than one frame but not longer than the entirety thereof. The size of the annual ring data preferably satisfies the following first and second conditions.

The first condition is that the seek time required to perform a seek operation with the recording area of the annual ring data skipped is shorter than the read time required to read the annual ring data from the optical disk. In other words, if the reading of the annual ring data completes faster than the skipping of the reading of the annual ring data, this interleave method remains unchanged from the frame-by-frame interleave method of FIG. 1A. It is thus required that the skipping of the reading of the annual ring data complete faster than the reading of the annual ring data. Preferably, the seek time is significantly shorter than the read time.

The second condition is that the annual ring data is as large in size as a buffer actually commercially available. In the annual ring interleave method, the video data V and the audio data A are alternately arranged by annual ring. To record the data, the buffer must have a size large enough to buffer the video data V of an annual ring data unit or the audio data A of an annual ring data unit. If a buffer having a capacity large enough to buffer the video data V of an annual ring data unit or the audio data A of an annual ring data unit is not available, data recording on the annual ring interleave method is difficult. The second condition thus requires the presence of a buffer having a capacity large enough to buffer the annual ring data.

When the annual ring data is stored in the buffer, the annual ring data cannot be recorded onto the optical disk. A delay occurs because of the storage of the annual ring data onto the buffer, and the delay time depends on the size of the annual ring data stored in the buffer, i.e., the size of the buffer. If the delay time caused by the storage of the annual ring data to the buffer is limited from the design point of view, the size of the buffer is determined so that the delay time falls within the limitation by design.

The first condition requires an annual ring data size as large as possible while the second condition requires an annual ring data size as small as possible. The two conditions thus trade off.

To satisfy the first condition that the seek time required to perform the seek operation with the reading of the annual ring data skipped is shorter than the reading time required to read the annual ring data, the annual ring data must straddle across a plurality tracks on the optical disk, in other words, the annual ring data must be longer than one track. To make the seek time for the annual ring data shorter than the read time for the annual ring data, the annual ring data must be typically as long as several tracks of the optical disk. The size of one track is typically several hundred KB, although it varies depending on a position across the radius of the optical disk.

As for the second condition that the buffer capable of buffering the annual ring data is available, the upper limit of the size of the buffer is as large as several MB, for example.

Roughly, the size of the annual ring data ranges from several MB to tens of MB. This size is considered to be equal to several tens of tracks on the optical disk.

Since the video data V and the audio data A alternately arranged and recorded on the optical disk looks like an annual ring of a tree trunk, the data is referred to as the annual ring data. The annual ring data may include other data in addition to the AV data.

The concept of a salvage marker recorded each time a slight amount of AV data is recorded is discussed below.

FIG. 2 illustrates the record order of data recorded on the optical disk. Recorded from left to right are a salvage marker SA1, audio data A, video data V, a salvage marker SA2, audio data A, video data V, a salvage marker SA3, audio data A . . .

The salvage marker includes, at least, information indicating a salvage marker (hereinafter a salvage marker ID representing an identification pattern identifying the salvage marker), and identification information (hereinafter referred to as UDF FF (universal disk format file entry) such as a file name) identifying a file (to which the audio data A and the video data V succeeding the salvage marker belong).

The salvage marker can contain a great deal of other information in addition to the salvage marker ID and the UDF FE. The other information will be discussed later with reference to FIG. 4.

When an optical disk failing to normally complete the recording process is loaded, a recording and reproducing apparatus 100 searches for the salvage marker ID on the optical disk, and reads the salvage marker from the optical disk. Based on the UDF FE contained in the read salvage marker, the recording and reproducing apparatus 100 determines that the audio data A and the video data V in succession to the salvage marker are data belonging to the file identified by the UDF FE.

By tracking the salvage markers, the recording and reproducing apparatus 100 searches for the audio data A and the video data V unregistered in the file system, and registers a file containing audio data A and video data V finally detected, as a file in the file system.

Figure 3:
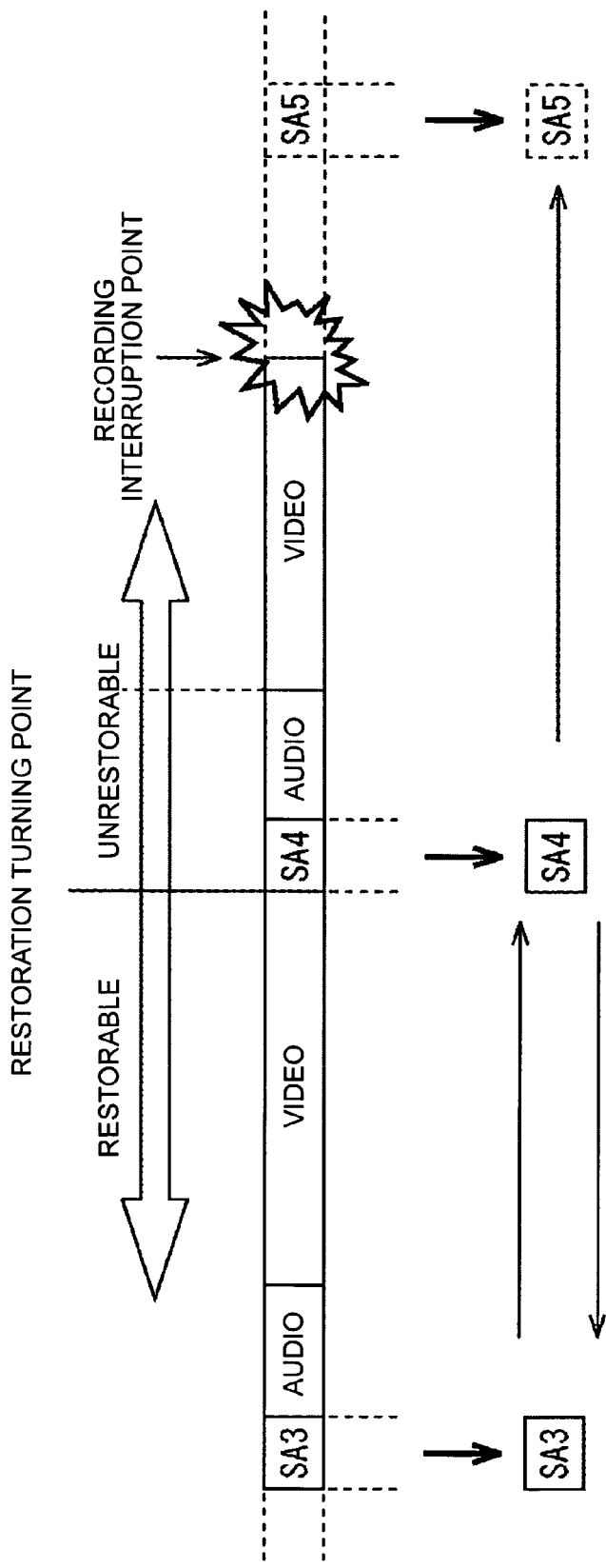
FIG. 3 illustrates the record of the annual ring data in the interrupted state thereof on the optical disk.

Shown from left to right in FIG. 3 are a salvage marker SA3, audio data A, video data V, a salvage marker SA4, audio data A, . . . , and the recording process is interrupted at a recording interruption point in the middle of next video data V. A salvage marker 5, expected to follow that video data V, is not actually recorded.

In the vicinity of the recording interruption point, the audio data A and the video data V recorded between the salvage marker SA3 and the salvage marker SA4 are used as part of data contained in the file. Data following the salvage marker SA4 is not used. Data before the salvage marker SA4 is constructed into one file. Although the audio data A and the video data V in succession to the salvage marker SA4 may be adopted, video may be disturbed or not displayed at all immediately before the end of playing. A user can edit the optical disk, cutting the data at a location immediately prior to the occurrence of disturbance or disappearance of the video. A file containing all data stored immediately prior to the recording interruption point is thus constructed.

FIG. 4 is a table listing information contained in the salvage marker. The information contained in the salvage marker is divided into management data and storage data. The management data includes a salvage marker ID, a salvage marker increment number, date and time of recording, a next salvage marker pointer, a unique material ID (UMID), and a management data header.

The salvage marker ID shows that information in succession thereto is a salvage marker, and is detected as an identification of the salvage marker. The salvage marker increment number shows the sequence of the salvage markers, and is a serial number, for example. The date and time of recording represent the data and time at which the salvage marker has been recorded, and is intended not to full-salvage process data which has been intentionally deleted by a user. Instead of using both the date and the time, one of the date and the time may be used, or another data that identifies timing of recording may be used. The next salvage marker pointer indicates a position of record of a salvage marker subsequent to the current salvage marker. The UMID identifies the material of the AV data. The management data header shows that information in succession thereto is storage data.

The storage data is divided into file data and file system management data. The file data includes program meta data, an add-on recorded index file, clip information, and non-real time (NRT) meta data. The file system management data includes UDF file entry (FF), a UDF allocation descriptor (UDF AD), and a defect list.

The program meta data is used to search for and edit annual ring data with the salvage marker interleaved therewithin on the optical disk. The index file is used to generally manage the annual ring data recorded on the optical disk. The clip information is used to manage clips (audio data and video data at timing not particularly specified between the start of picture taking to the end of the picture taking) contained in the annual ring data. The non-real time (NRT) meta data is used to search for and edit the clips of video and audio contained in the annual ring data and requires non-real time property.

Figure 5:
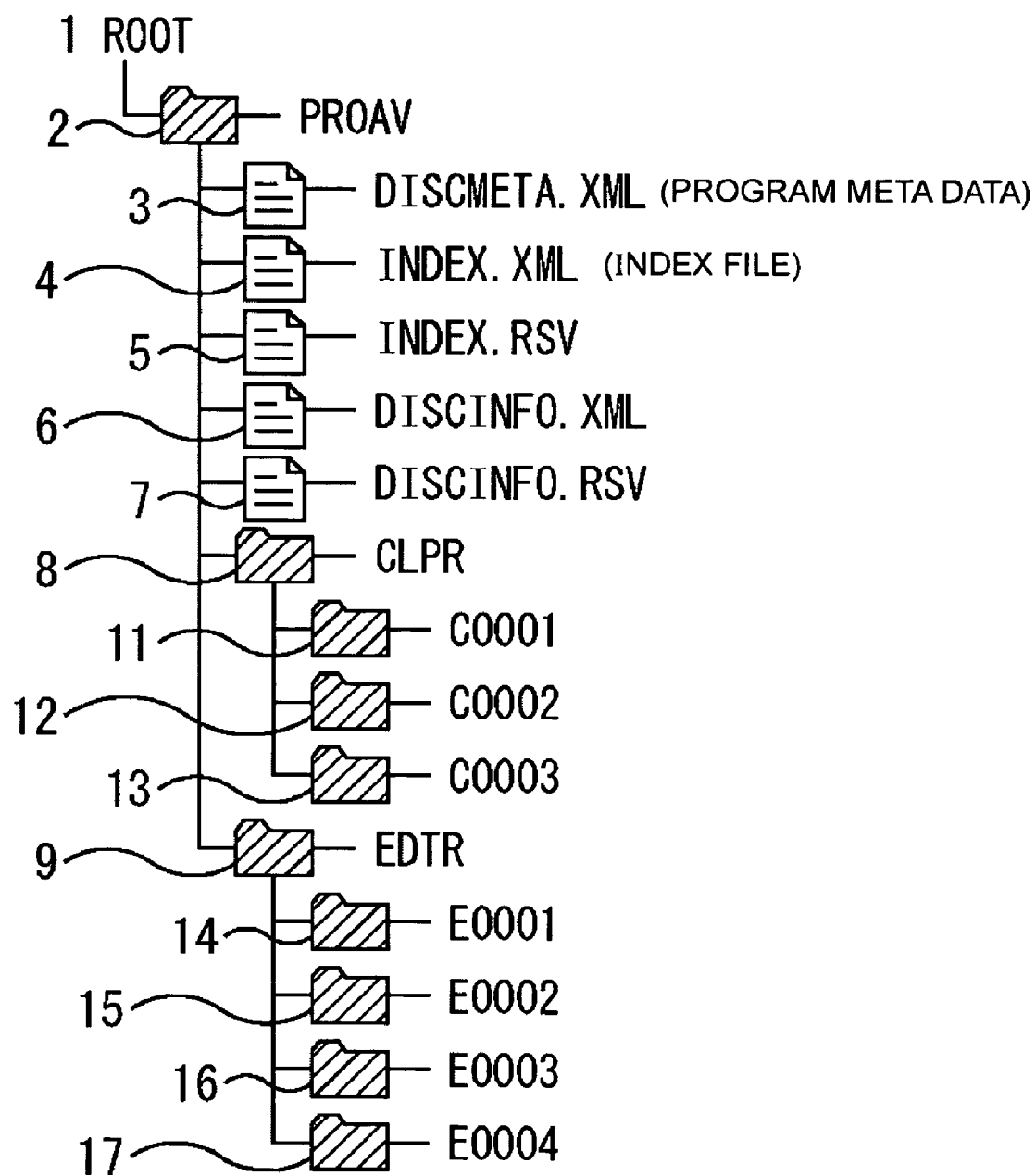
FIG. 5 illustrates the directory structure of file data contained in the salvage marker.
Figure 6:
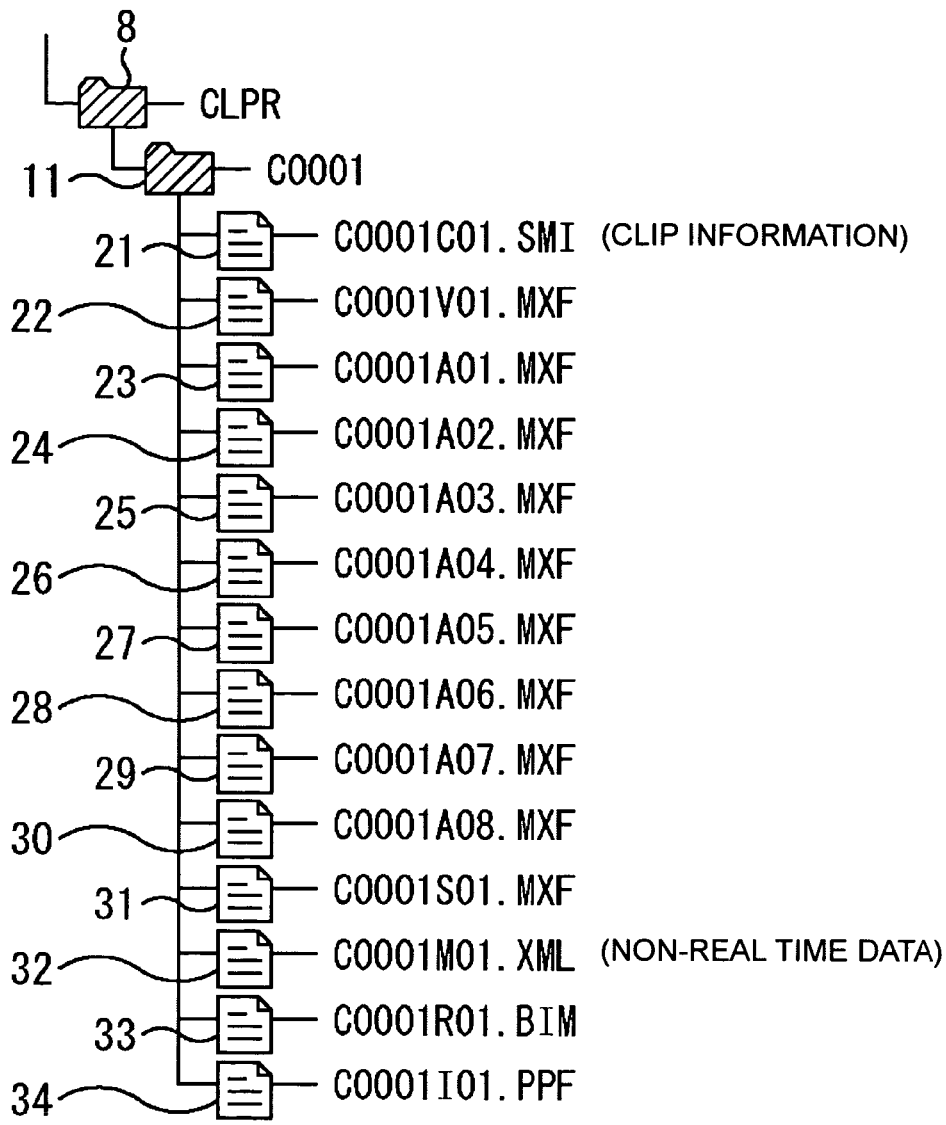
FIG. 6 illustrates the directory structure of the file data contained in the salvage marker.
Figure 7:
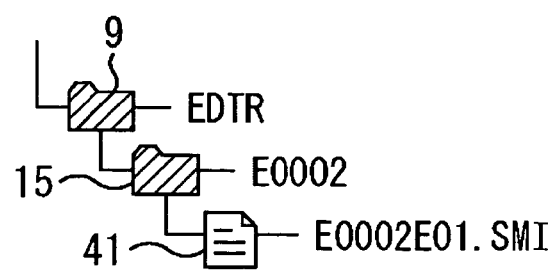
FIG. 7 illustrates the directory structure of the file data contained in the salvage marker.

The program meta data, the add-on recorded index file, the clip information, and the non-real time meta data, contained in the file data, are managed in directory structures of FIGS. 5-7.

FIGS. 5-7 illustrate the directory structures in the optical disk. As shown in FIG. 5, a PROAV directory 2 is arranged immediately under a root directory (ROOT) 1. The video data V, the audio data A, and other data are stored directly or in subdirectories under the PROAV directory 2.

Arranged under the PROAV directory 2 are a disk meta file (DISCMET.XML) 3 (corresponding to program meta data) as a file containing titles and comments for all data recorded on the optical disk, and an index file (INDE.XML) 4 and an index file (INDEX.RSV) 5, each containing management information for managing all clips and edit lists recorded on the optical disk. The index file 5 is a copy of the index file 4, and this redundancy of two identical files ensures reliability.

Arranged further under the PROAV directory 2 are a disk information file (DISCINFO.XML) 6 and a disk information file (DISCINFO.RSV) 7, each containing meta data for all data recorded on the optical disk, such as information concerning disk attributes, a replay start position, and disk record inhibited. The disk information file 7 is a copy of the disk information 6, and this redundancy of two identical files ensures reliability.

Still arranged under the PROAV directory 2 are a clip root directory (CLPR) 8 having lower ranking directories under which clip data is arranged, and an edit list root directory (EDTR) 9 having lower ranking directories under which edit list data is arranged.

The clip root directory 8 has directories under which clip data recorded on the optical disk is separately managed on one clip per directory basis. As shown in FIG. 5, for example, three clips of data are managed with one clip on a clip directory (C0001) 11, another clip on a clip directory (C0002) 12, and a third clip on a clip directory (C0003) 13. The edit list root directory 9 has directories under which an edit list (edit information representing an edit content when an edit process is performed on a clip) recorded on the optical disk is managed on an edit process per directory basis. As shown in FIG. 5, the four edit lists are managed at an edit list directory (E0001) 14, an edit list directory (E0002) 15, an edit list directory (E0003) 16, and an edit list directory (E0004) 17, respectively.

As shown in FIG. 6, the clips of data recorded first on the optical disk are arranged and managed as files in directories under the clip directory 11 arranged under the clip root directory 8.

Arranged under the clip directory 11 as shown in FIG. 6 are a clip information file (C0001C01.SMI) 21 managing this clip, a video data file (C0001V01.MXF) 22 containing video data of this clip, eight audio data files (C0001A01.MXF-C0001A08.MXF) 23-30 containing audio data of each channel of this clip, a low resolution data file (C0001S01.MXF) 31 containing low resolution data of the video data of this clip (video data composed of the same material as the basic video data, lower in resolution than the basic video data and smaller in data amount than the basic video data), and a clip meta data file (C0001M01.XML) 32 containing clip meta data requiring no real-time property, such as a conversion table for associating a linear time code (LTC) of clip essence data with a frame number.

The clip directory 11 also includes a frame meta data file (C0001R01.BIM) 33 containing frame meta data requiring real-time property, such as LTC for clip essence data, and a picture pointer file (C0001I01.PPF) 34 described in a frame structure of the video data file 22 (for example, information concerning compression method of each picture, such as MPEG, and information such as an offset address from the head of the file).

FIG. 7 illustrates the file structure of directories under the edit list root directory 9. An edit list directory 15 arranged under the edit list root directory 9 includes, as a file thereunder for management, edit list data, i.e., information relating to a second edit result of the data of each clip recorded on the optical disk as shown in FIG. 7.

Referring to FIG. 7, the edit list directory 15 includes thereunder an edit list file (E0002E01.SMI) 41 for managing an edit list, and an edit list clip meta data file (E0002M01.XML) 42 (not shown) containing clip meta data corresponding to essence data subsequent to the editing (a portion extracted, as data subsequent editing, from the essence data of all clips used in the editing), or clip meta data newly generated based on that clip data.

Returning to FIG. 4, the UDF file entry of the file system management data is identification information for identifying a file to be restored based on the salvage marker, and is a file name, for example. The UDF allocation descriptor is information representing the layout of the audio data A, the video data V, etc. in the annual ring data. The defect list shows a location of each defect that has taken place during the recording of the annual ring data.

Figure 8:
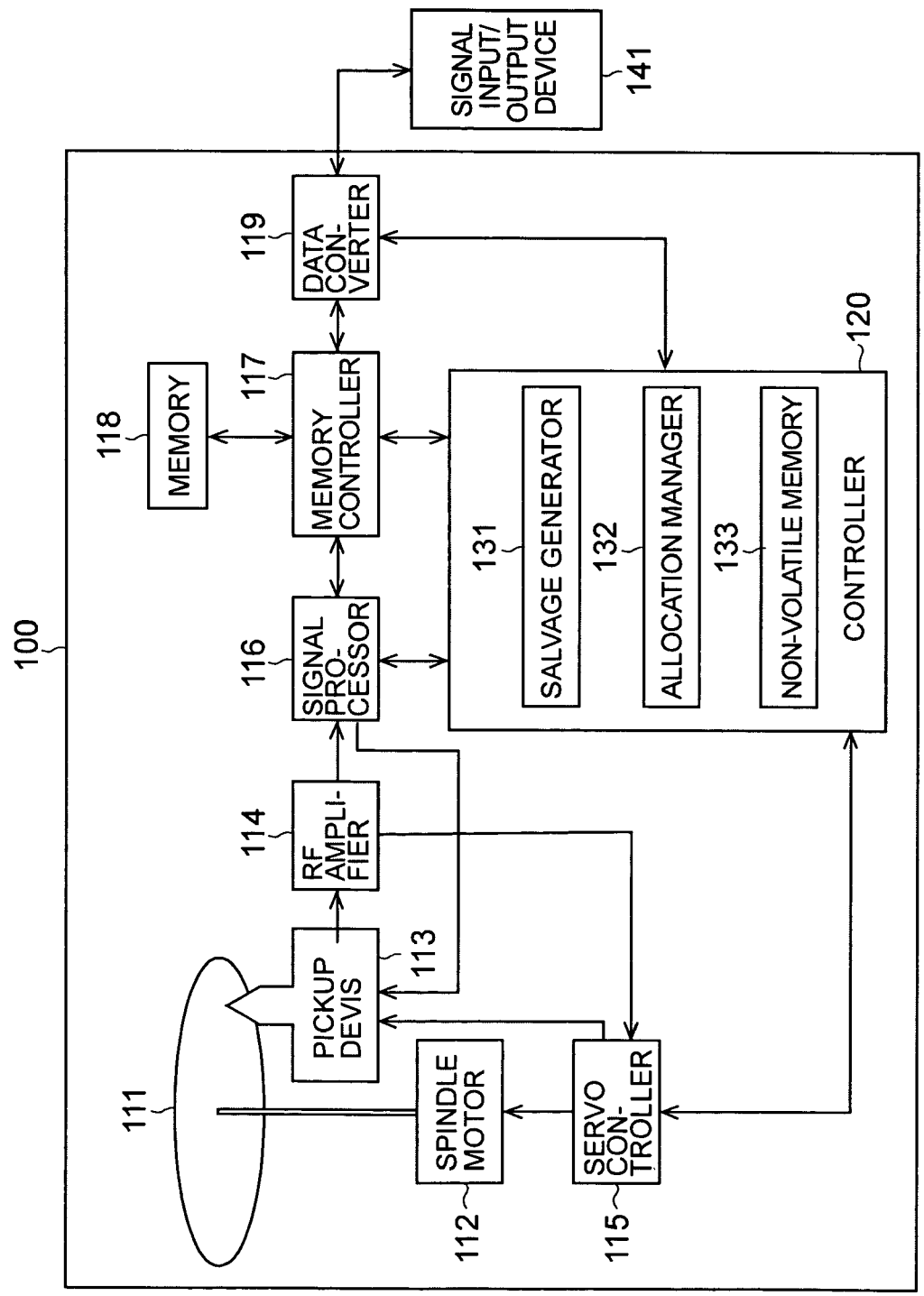
FIG. 8 is a block diagram illustrating a recording and reproducing apparatus in accordance with one embodiment of the present invention.

The recording and reproducing apparatus 100 of the embodiment of the present invention is described below with reference to FIG. 8. In the recording and reproducing apparatus 100, a spindle motor 112 drives an optical disk 111 at a constant linear velocity (CLV) or a constant angular velocity (CAV) in response to a spindle motor drive signal from a servo controller 115.

During recording, a pickup device 113 controls a laser light output in response to a record signal supplied from a signal processor 116, thereby recording the record signal onto the optical disk 111. During playing, the pickup device 113 directs a laser beam to the optical disk 111, receives laser light reflected from the optical disk ill, and photoelectrically converts the received laser light into a current signal, and supplies a radio-frequency (RF) amplifier 114 with the current signal. A laser beam irradiation position on the optical disk 111 is controlled by a servo signal supplied from the servo controller 115 to the pickup device 113.

The RF amplifier 114 generates a focus error signal, a tracking error signal, and a replay signal in response to the current signal from the pickup device 113. The RF amplifier 114 supplies the tracking error signal and the focus error signal to the servo controller 115, while supplying the replay signal to the signal processor 116.

The servo controller 115 performs a focus servo operation and a tracking servo operation. More specifically, the servo controller 115 generates a focus servo signal and a tracking servo signal in response to the focus error signal and the tracking error signal, respectively, and supplies an actuator (not shown) of the pickup device 113 with the focus servo signal and the tracking servo signal. The servo controller 115 generates the spindle motor drive signal driving the spindle motor 112, thereby performing a spindle servo operation to control the optical disk 111 to a desired speed of rotation.

The servo controller 115 performs a sled control to move the pickup device 113 radially across the optical disk 111 to shift the irradiation position of the laser light beam. The controller 120 sets a signal read position of the optical disk 111. The pickup device 113 is controlled in position in order to read a signal at the set signal read position.

The signal processor 116 modulates AV data to be recorded onto the optical disk 111, inputted from a memory controller 117, and a salvage marker inputted from a salvage generator 131 in the controller 120, thereby generating a record signal. The record signal is supplied to the pickup device 113. The signal processor 116 also demodulates the replay signal inputted from the RF amplifier 114, thereby generating replay data. The replay data is fed to the memory controller 117.

The memory controller 117 causes a memory 118 to store the AV data, inputted from the data converter 119, and the stored AV data is then recorded onto the optical disk 111 as required, as will be discussed later. The memory controller 117 also reads the AV data from the memory 118 and supplies the read AV data to the signal processor 116. The memory controller 117 causes the memory 118 to store AV data contained in the replay data from the signal processor 116 and then reads the AV data from the memory 118 to supply the AV data to a data converter 119. The memory controller 117 causes the memory 118 to store a salvage marker contained in the replay data from the signal processor 116 and reads the salvage marker and supplies the read salvage data to the controller 120.

The data converter 119 codes a video signal, an audio signal, etc., acquired by a video camera (not shown), a video signal, an audio signal, etc., replayed from any recording medium (not shown), according to a method, such as the moving picture experts group (MPEG) standard, or the joint photographic experts group (JPEG) standard, and supplies the memory controller 117 with the resulting AV data. The data converter 119 may be dispensed with.

The data converter 119 decodes AV data contained in the replay data from the memory controller 117, converts the resulting video signal and audio signal to an output signal in a predetermined format, and outputs the resulting signal to a signal input/output device 141.

The controller 120 controls the servo controller 115, the signal processor 116, the memory controller 117, and the data converter 119, thereby performing a recording process, a full-salvage process (for constructing a unrecorded file system based on the salvage marker) and a simple-salvage process (for quickly resuming a recording process when power is turned on again after a recording process has failed to normally complete due to a power interruption, for example). The controller 120 includes a salvage generator 131, an allocation manager 132, and a non-volatile memory 133.

During the recording process, the salvage generator 131 generates the salvage marker composed of data listed in the table of FIG. 4, and supplies the memory controller 117 with the generated salvage marker. The salvage generator 131 generates backup information for use in the simple-salvage process, and stores the backup information in the non-volatile memory 133.

The allocation manager 132 manages the recording position and replay position of data on the optical disk 111. The non-volatile memory 133 stores the backup information generated by the salvage generator 131.

The recording and reproducing apparatus 100 may include a disk loading motor for loading and unloading the optical disk 111, a display for displaying operational status and a variety of guides of the recording and reproducing apparatus 100, and an operation panel for receiving operational inputs from a user, although these elements are not shown.

FIG. 9 illustrates the structure of the backup information generated by the salvage generator 131. The backup information is divided into management data and storage data. The management data includes date and time of recording, an index ID, and a storage data header. The date and time of recording indicate the date and time at which the backup information is recorded or updated. The index ID is unique information that is granted to the optical disk loaded in the recording and reproducing apparatus 100 when the optical disk ill is formatted.

The storage data includes a new allocation area allocation descriptor (AD) and a defect list. The new allocation area AD represent the location of available area on the optical disk reserved for the writing of the salvage marker, and the annual ring data including the audio data A and the video data V. Each time the annual ring data is recorded, the new allocation AD is recorded in an overwriting fashion or an add-on recording fashion. More specifically, if an empty space is available in succession to a previously reserved area where the annual ring data is currently being written, reserving is extended to allow the annual ring data to overwrite the empty space. If no empty space is available in succession to a previously reserved area where the annual ring data is currently being written, a separately located empty area is reserved, and the annual ring data is written in an add-on recording fashion. The defect list indicates locations of defects of the data on the optical disk.

Figure 10:
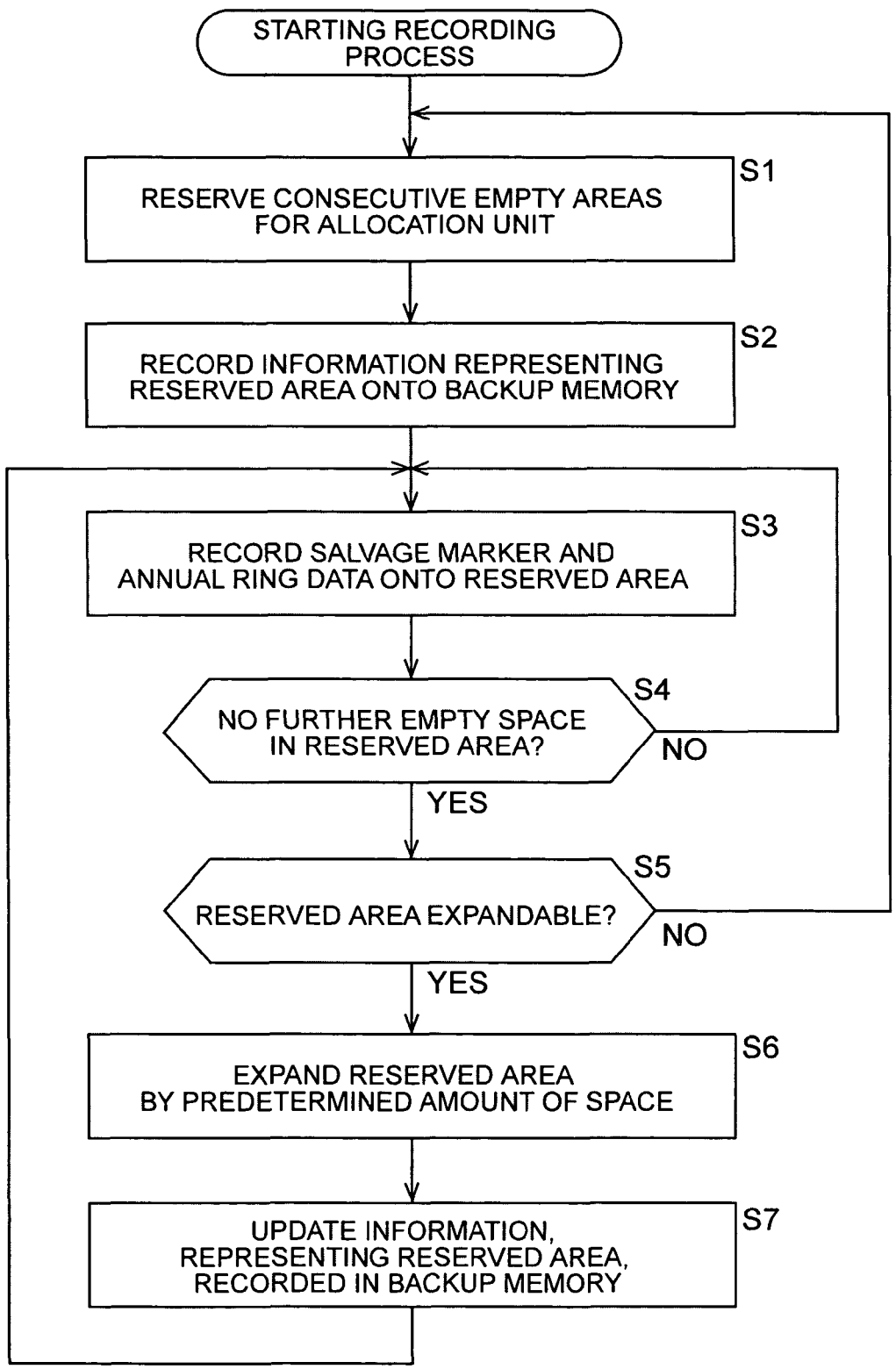
FIG. 10 is a flowchart illustrating a recording process of the recording and reproducing apparatus of FIG. 8.

With reference to a flowchart of FIG. 10, and diagrams of FIGS. 11 through 17, the recording process of the recording and reproducing apparatus 100 is described below. FIGS. 11 through 17 illustrate recording areas of the optical disk 111 and information recorded on the non-volatile memory 133.

Figure 12:
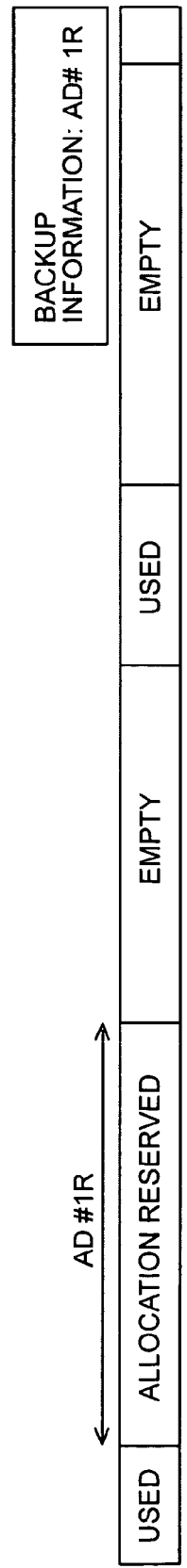
FIG. 12 illustrates the recording process of the recording and reproducing apparatus of FIG. 8.

As shown in FIG. 11, an empty area is present on the optical disk 111 at the initial state. The non-volatile memory 133 stores nothing. In step S1, the allocation manager 132 reserves consecutive areas for allocation unit representing the number of logical blocks preset on the optical disk 111. As shown in FIG. 12, an area AD#1R is now reserved, for example.

In step S2, the salvage generator 131 generates backup information containing information representing the area reserved in step S1, and stores the generated backup information onto the non-volatile memory 133. As shown in FIG. 12, the area AD#1R is recorded, as the information representing the reserved area, on the non-volatile memory 133.

In step S3, the controller 120 controls related elements to successively record the salvage markers and a predetermined amount of annual ring data (containing the audio data A, the video data V, and other data) in the reserved area on the optical disk 111. The salvage markers and annual ring data to be recorded are already generated.

In step S4, the controller 120 determines whether no further empty space is available in the reserved area after the recording of the salvage markers and the annual ring data (in other words, whether recording is still possible in the reserved area). If it is determined that an empty space is available in the reserved area, the process returns to step S3 where the salvage markers and the annual ring data are recorded on the reserved area in the optical disk.

Figure 13:
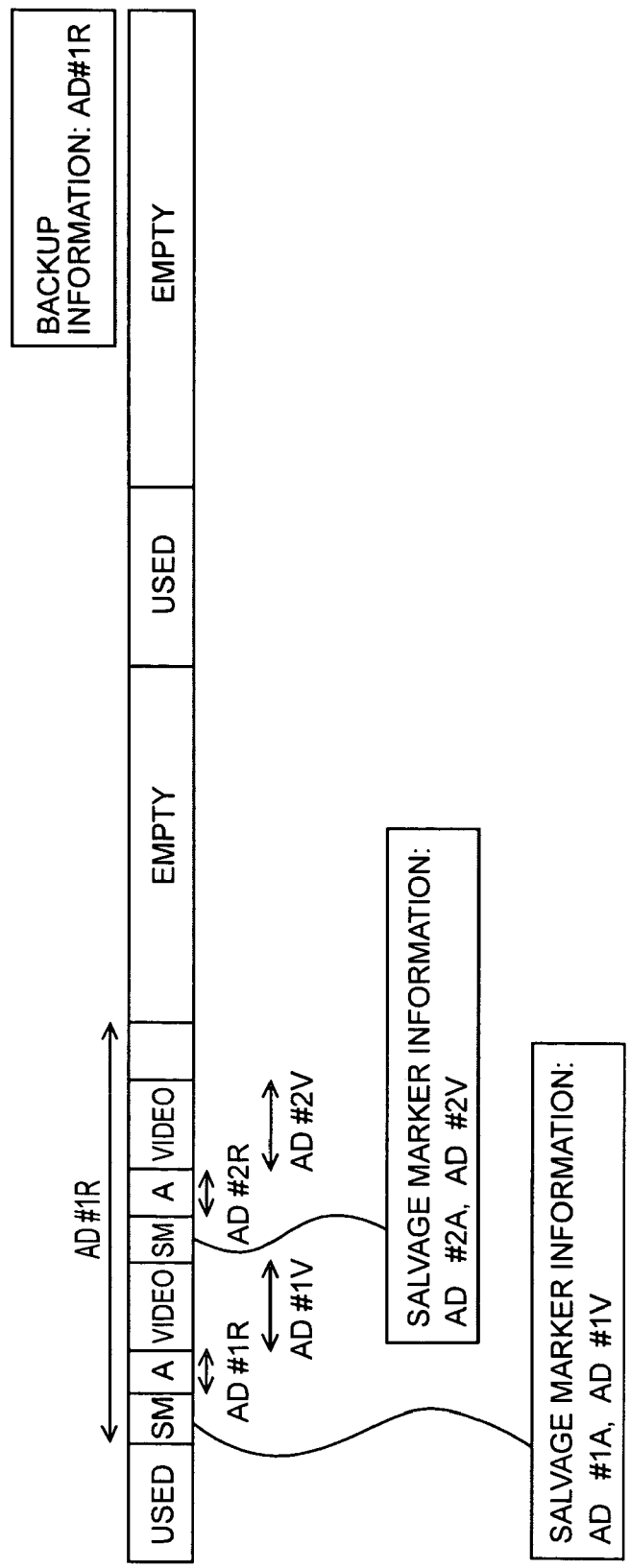
FIG. 13 illustrates the recording process of the recording and reproducing apparatus of FIG. 8.

If the salvage markers and the annual ring data are recorded in the reserved area AD#1R as shown in FIG. 13, the controller 120 determines in step S4 that no further empty space is available in the reserved area, and then proceeds to step S5. In step S5, the allocation manager 132 determines whether the reserved area is extensible, based on a determination of whether an empty space is available in succession to the area reserved in step S1. If an empty space remains in succession to the reserved area AD#1R as shown in FIG. 13, for example, the allocation manager 132 determines in step S5 that the reserved area is extensible, and then proceeds to step S6.

Figure 14:
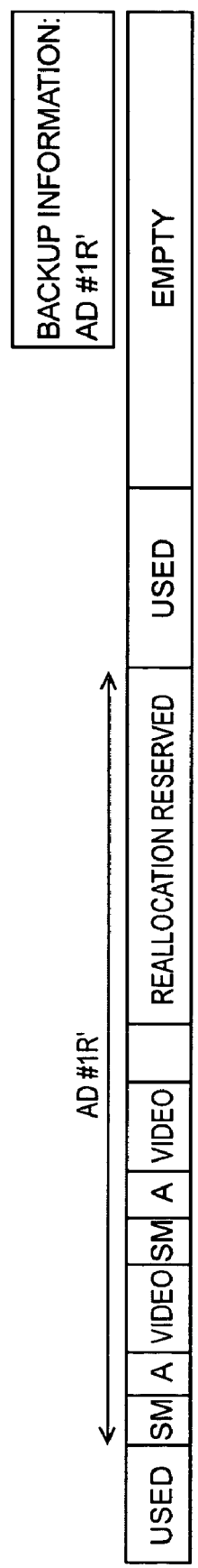
FIG. 14 illustrates the recording process of the recording and reproducing apparatus of FIG. 8.
Figure 15:
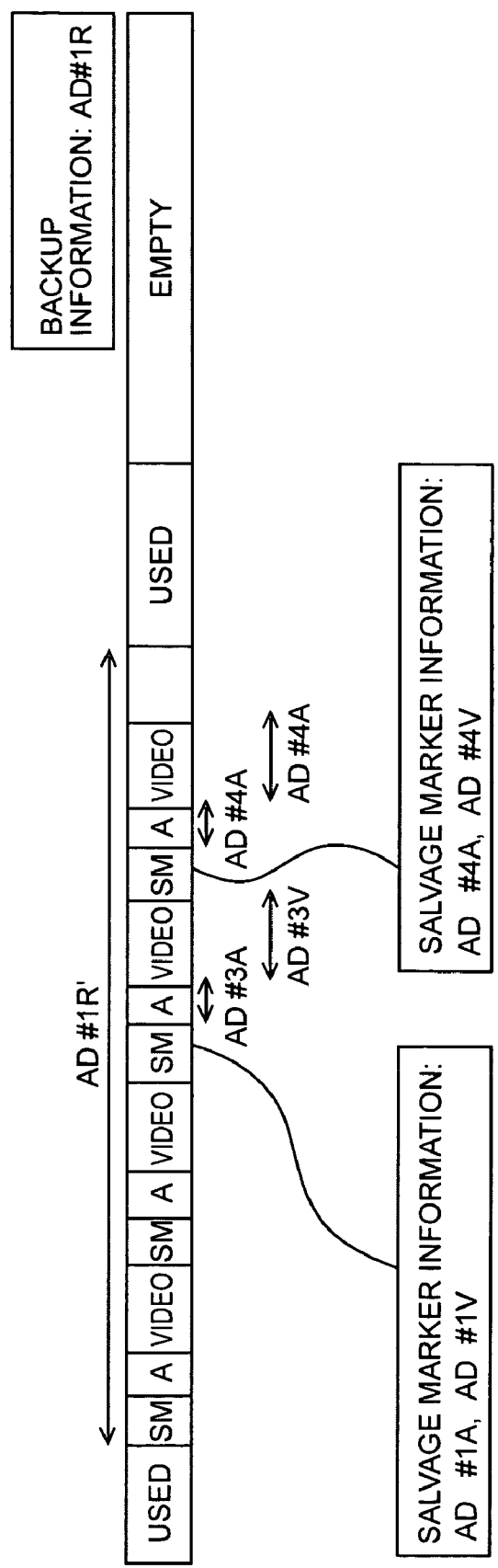
FIG. 15 illustrates the recording process of the recording and reproducing apparatus of FIG. 8.

In step S6, the allocation manager 132 extends the area AD#1R reserved in step S1 by a predetermined amount as shown in FIG. 14, and reserves the extended area again. In step S7, the salvage generator 131 updates the backup information containing the information AD#1R representing the reserved area, stored onto the non-volatile memory 133 in step S2, to information AD#1R' extended and reserved in step S6. The process returns to step S3, and process in step S3 and subsequent steps is performed.

Figure 16:
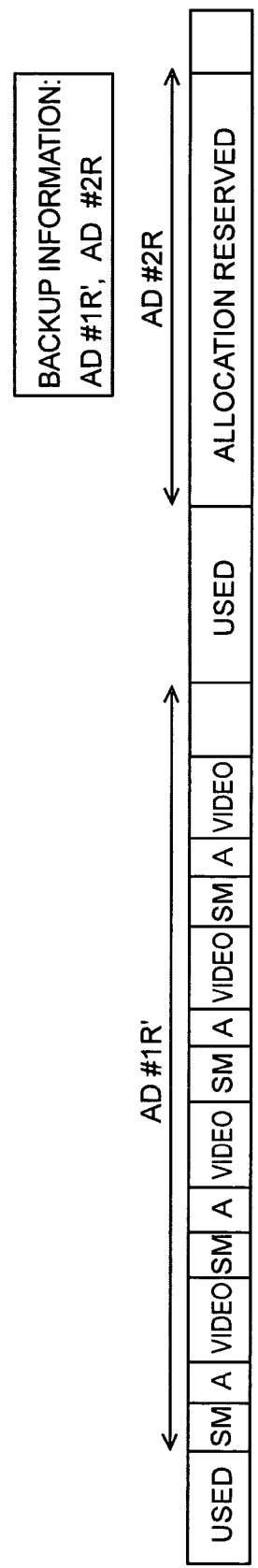
FIG. 16 illustrates the recording process of the recording and reproducing apparatus of FIG. 8.

When no further empty space is available with the salvage markers and the annual ring data recorded on the reserved area AD#1R' as shown in FIG. 16, it is determined in step S5 that no further empty space is available in succession to the reserved area AD#1R'. The process returns to step S1. In step S1, the allocation manager 132 newly searches for and reserves consecutive areas for an allocation unit. In step S2, the salvage generator 131 additionally writes information AD#2R, representing the area reserved in step S1, to the backup information in the non-volatile memory 133 in an add-on fashion. The backup information in the non-volatile memory 133 now contains information AD#1R' and AD#2R.

The above process is repeated until the recording of all annual ring data completes. When the recording of all annual ring data completes, the file system on the optical disk 111 is updated in accordance with the recorded annual ring data. The recording process thus completes.

Figure 17:
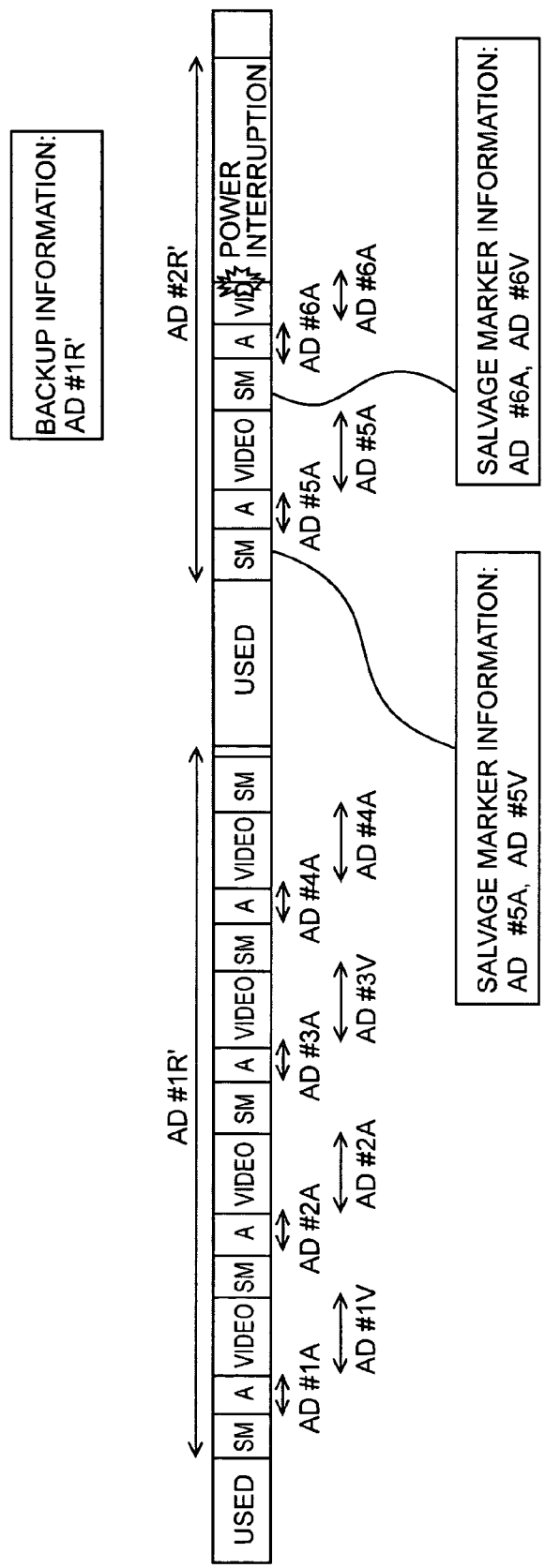
FIG. 17 illustrates the recording process of the recording and reproducing apparatus of FIG. 8.

Power is now interrupted in the middle of recording the annual ring data on the reserved area AD#2R as shown in FIG. 17. When power is turned back on later, a simple-salvage process is performed based on the backup information stored in the non-volatile memory 133. The data recorded on the areas AD#1R' and AD#2R is protected and the recording process resumes quickly.

In a full-salvage process, a file system corresponding to the audio data A recorded on areas AD#1A through AD#6A and the video data V recorded on areas AD#1V through AD#6V are restored based on the recorded salvage markers, and the audio data A recorded on areas AD#1A through AD#6A and the video data V recorded on areas AD#1V through AD#6V are restored back to a playable state.

Figure 18:
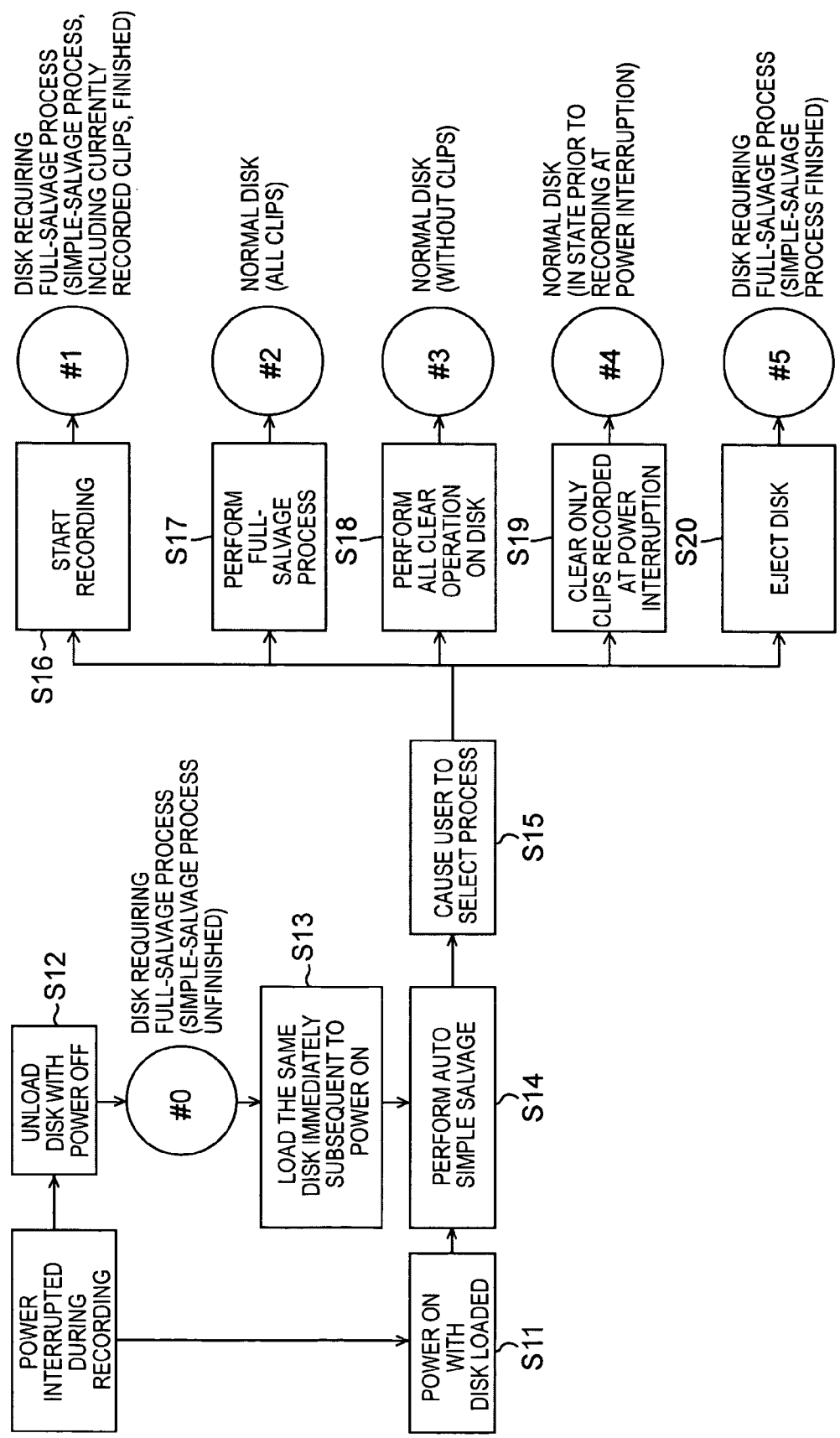
FIG. 18 illustrates a process performed on the optical disk on which the recording process is interrupted.

The process to be performed on the optical disk 111 is described below with reference to FIG. 18. The recording process is suspended on the optical disk 111 in the state of FIG. 17 when power is interrupted on the recording and reproducing apparatus 100 in the middle of recording of the annual ring data. The optical disk 111 requiring the simple-salvage process and the full-salvage process is hereinafter referred to as an optical disk #0.

When power is turned back on with the optical disk #0 loaded (step S11), the simple-salvage process is performed (step S14). With the simple-salvage process, the data recorded immediately prior to the suspension of the recording is protected from deletion. In step S15, a user selects one of the following processes: a process for immediately starting recording (step S16); an execution of the full-salvage process (step S17); an all clear process on the data recorded on the optical disk #0 (step S18); a clear process on a clip composed of a series of files that were being recorded at the occurrence of power interruption (step S19); and a process of unloading the optical disk #0 from the recording and reproducing apparatus 100 (step S20).

After the optical disk 111 became the optical disk #0 at the occurrence of power interruption of the recording and reproducing apparatus 100, the optical disk #0 is unloaded with the power still off (step S12). The optical disk #0 is then loaded (step S13) after power is turned on in the recording and reproducing apparatus 100. In this case, the simple-salvage process is performed (step S14). The simple-salvage process protects the data recorded immediately prior to the suspension of the recording from being deleted by overwriting. The user then selects a subsequent process to be performed (step S15).

If the process of immediately starting recording data is performed in accordance with the user selection in step S15 (step S16), the optical disk #0 is simple-salvage processed but not full-salvage processed. The optical disk 111 under this state is hereinafter referred to as an optical disk #1.

If the full-salvage process is performed in accordance with the user selection in step S15 (step S17), the optical disk #0 becomes a normal optical disk with all data thereof playable. The optical disk 111 under this state is hereinafter referred to as an optical disk #2.

If the all clear process is performed on the data on the optical disk #0 in accordance with the user selection in step S15 (step S18), all data recorded on the optical disk #0 is deleted, and becomes data recordable. The optical disk 111 under this state is hereinafter referred to an optical disk #3.

If the clear operation is performed to delete a series of files being recorded at the power interruption in accordance with the user selection in step S15 (step S19), the optical disk #0 becomes normal in a state prior to the recording of the series of files suspended at the occurrence of the power interruption. The optical disk 111 under this state is hereinafter referred to as an optical disk #4.

The clip clear process is performed by updating the file system in the optical disk 111 to a state under which information about each file constituting the clip (information identifying the file and the recording position) is deleted.

If the unloading process for unloading the optical disk #0 from the recording and reproducing apparatus 100 is performed in accordance with the user selection in step S15 (step S20), the optical disk #0 is simple-salvage processed but not full-salvage processed. The optical disk 111 under this state is hereinafter referred to as an optical disk #5.

Figure 19:
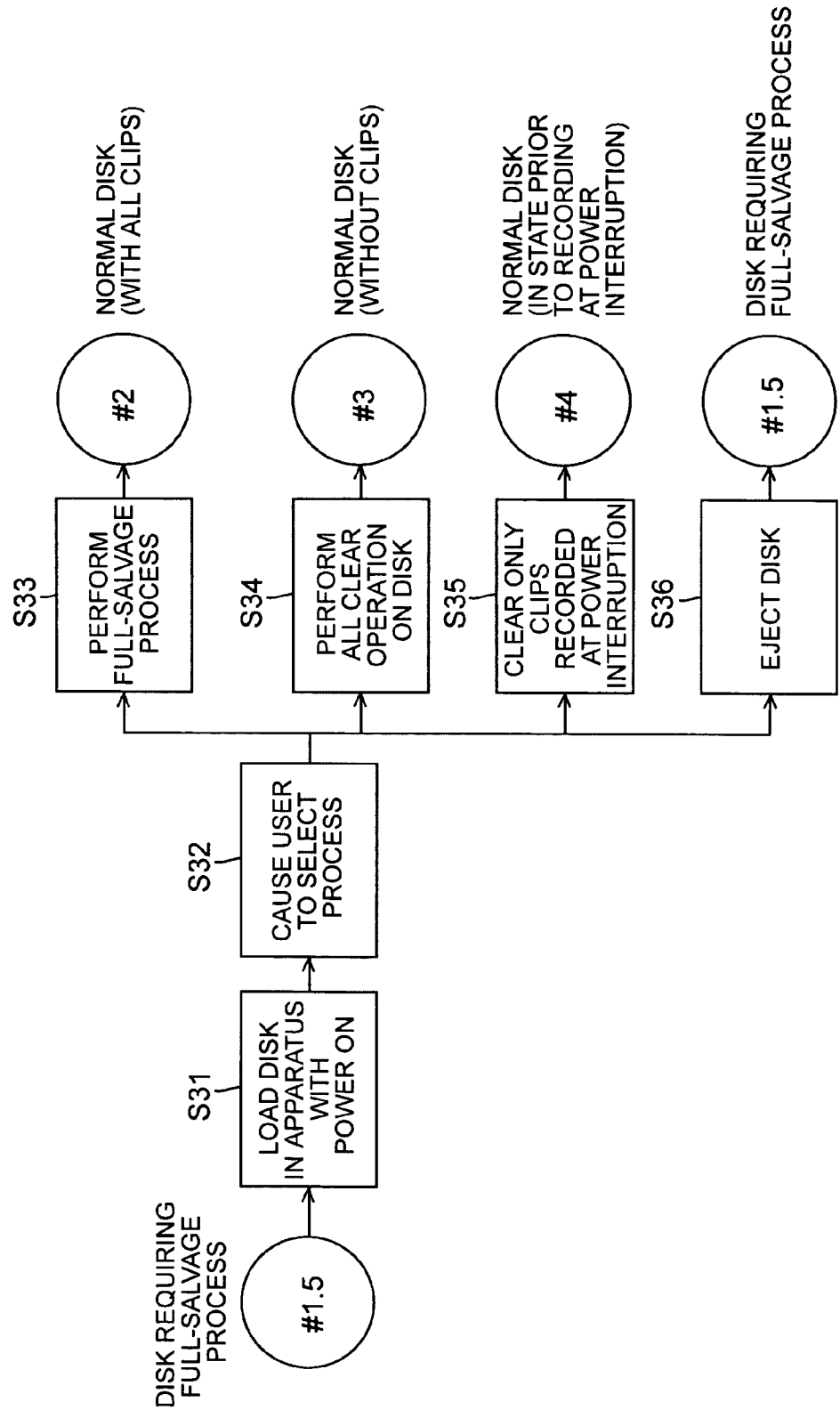
FIG. 19 illustrates a process performed on the optical disk on which the recording process is interrupted.

The process performed to the optical disk #1 and the optical disk #5, each having undergone no full-salvage process, is described below with reference to FIG. 19. One of the optical disks #1 and #5 is loaded on the recording and reproducing apparatus 100 with power on (step S31), or the recording and reproducing apparatus 100 is turned on with one of the optical disks #1 and #5 loaded (step S31). In step S32, the user selects one of the following processes: a full-salvage process (step S33); an all clear process to clear all data recorded on the one of the optical disks #1 and #5 (step S34); a clear process to clear a clip being recorded at the occurrence of the power interruption (step S35); and an unloading process to unload the one of the optical disks #1 and #5 from the recording and reproducing apparatus 100 (step S36).

If the full-salvage process is performed in accordance with the user selection in step S32 (step S33), the one of the optical disks #1 and #5 becomes the optical disk #2 that permits the data thereof to be played.

If the all clear process is performed in accordance with the user selection in step S32 (step S34), the one of the optical disks #1 and #5 becomes the optical disk #3 that permits data to be recorded thereon.

If the clear process to clear the clip (a predetermined amount of annual ring data) being recorded at the time of the power interruption is performed in accordance with the user selection in step S32 (step S35), the one of the optical disks #1 and #5 becomes the optical disk #4 that is in a state prior to the recording of the series of files during which the power interruption occurred.

If the unloading process to unload the one of the optical disks #1 and #5 from the recording and reproducing apparatus 100 is performed in accordance with the user selection in step S32 (step S36), the one of the optical disks #1 and #5 is simply unloaded.

Figure 20:
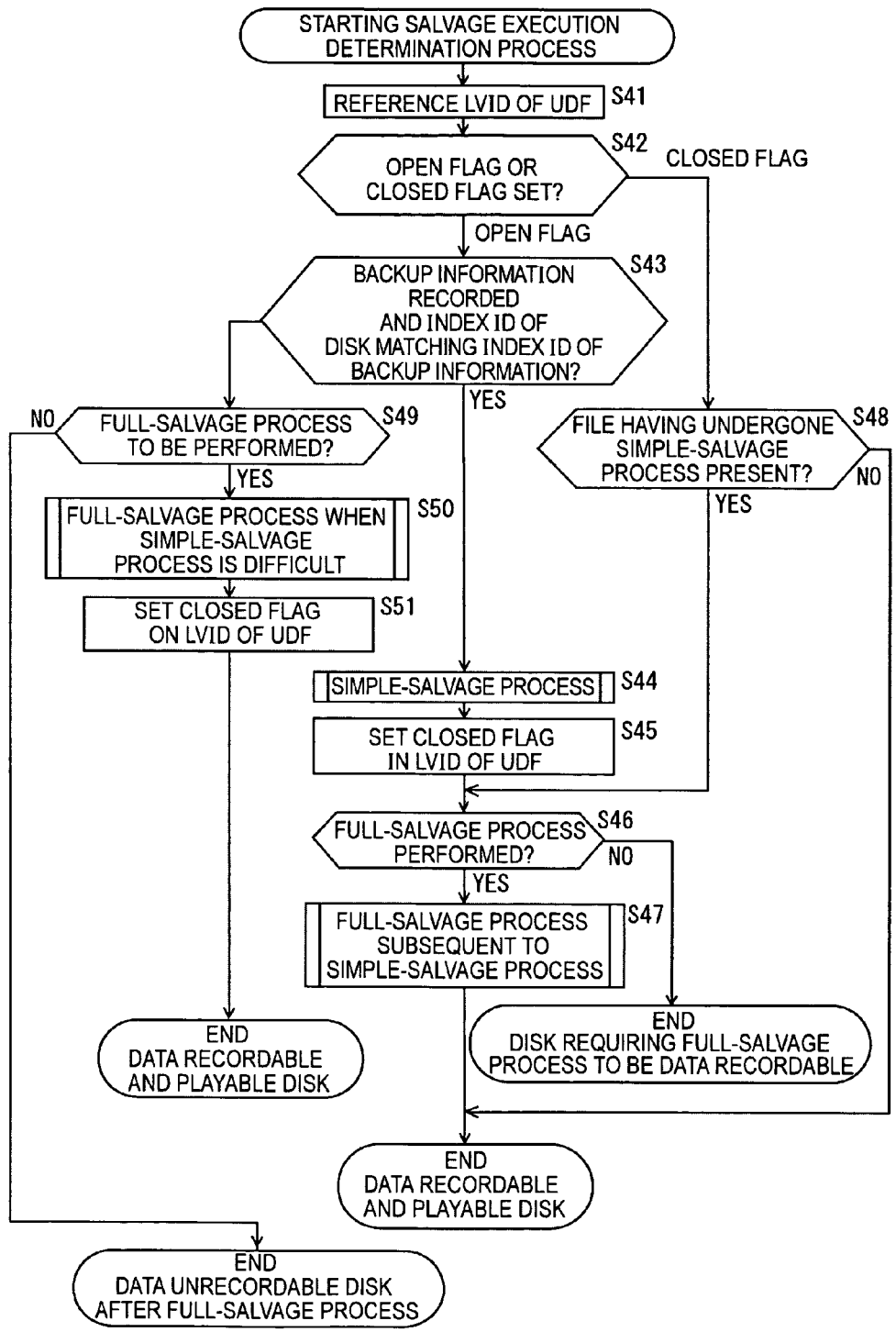
FIG. 20 is a flowchart of a salvage execution determination process of the recording and reproducing apparatus of FIG. 8.

A salvage execution determination process of the recording and reproducing apparatus 100 is described below with reference to a flowchart of FIG. 20. The salvage execution determination process is initialized when the power of the recording and reproducing apparatus 100 is restored and turned on with the optical disk 111 loaded therewithin, or when the optical disk 111 is loaded with the power on.

In step S41, the controller 120 controls elements of the recording and reproducing apparatus 100, thereby acquiring the UDF as a system file recorded on the optical disk 111, and referencing the LVID of the UDF. The LVID is a flag that indicates whether the file recorded on the optical disk 111 is normally closed. The controller 120 determines in step S42 whether the flag of the LVID is open or closed. If it is determined that the LVID is an open flag, the process proceeds to step S43.

The controller 120 determines in step S43 whether an index ID contained in the backup information stored in the non-volatile memory 133 matches a unique index ID recorded on the optical disk 111. If it is determined that the two IDs match each other, the controller 120 determines that the loaded optical disk 111 is the optical disk #0 requiring both the simple-salvage process and the full-salvage process. The process proceeds to step S44. In step S44, the simple-salvage process is performed on the optical disk 111.

Figure 21:
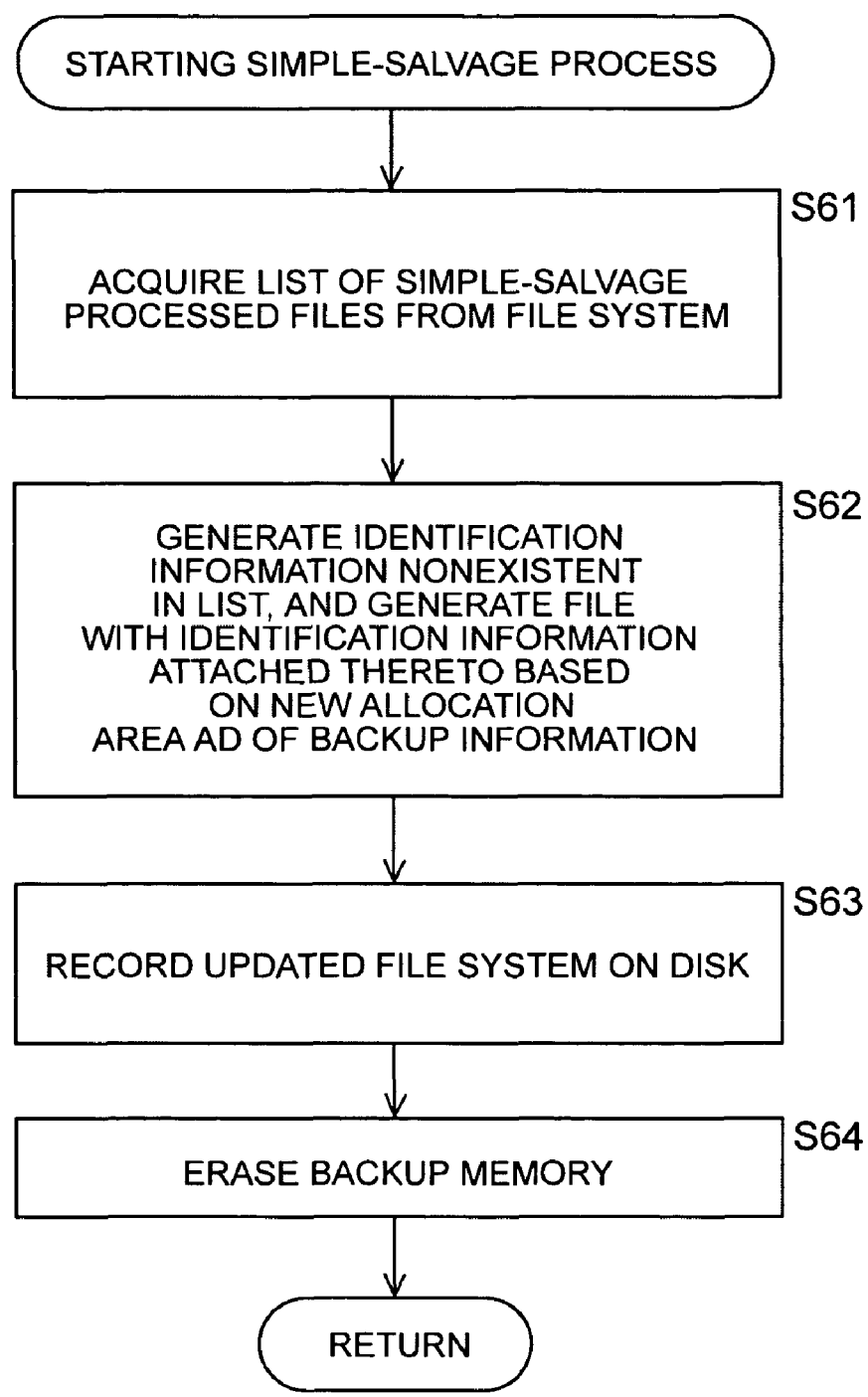
FIG. 21 is a flowchart illustrating one process of FIG. 20.

The simple-salvage process in step S44 is described below with reference to a flowchart of FIG. 21.

In step S61, the controller 120 acquires a list of simple-salvage processed files from the file system of the optical disk 111. Each simple-salvage processed file is tagged with identification information for identifying the file and indicating that the file is simple-salvage processed. For example, the identification information can be a file name containing a serial number and a character string indicating a simple-salvage processed file. In step S61, the controller 120 thus searches the file system for the file tagged with the identification information that shows that the file is simple-salvage processed, and generates the list of such files.

In step S62, the controller 120 generates identification information, non-existent in the list acquired in step S61, determined to be simple-salvage processed, according to a predetermined rule (for example, generates identification information composed of a serial number and a character string indicating that the corresponding file is simple-salvage processed) and generates the file tagged with the generated identification information, the file having as the content thereof the data recorded on the area represented by a new allocation area AD contained in the backup information in the non-volatile memory 133. More specifically, the information (the identification information generated in step S62 and the area indicated by the new allocation area AD contained in the backup information in the non-volatile memory 133) corresponding to the generated file is recorded on the read file system. The read file system thus updated.

In step S63, the controller 120 controls the elements, thereby causing the file system updated in step S62 to be recorded onto the optical disk 111. In step S64, the controller 120 deletes the backup information from the non-volatile memory 133.

The data, recorded on the optical disk 111 but unrecorded in the file system, is tagged with the identification information (such as the file name) permitting the file to be determined as being the simple-salvage processed, and is then registered in the file system. Even if a new file is recorded on the optical disk 111, the data is protected from being deleting by overwriting. The simple-salvage process has been discussed.

Returning to FIG. 20, in step S45, the controller 120 sets a closed flag in the LVID of the UDF as the file system recorded on the optical disk 111. In step S46, the controller 120 causes the user to decide whether to perform the full-salvage process on a user interface (not shown), and detects the decision result. If the user decides to perform the full-salvage process, the controller 120 proceeds to step S47 where the full-salvage process is performed after the simple-salvage process.

Figure 22:
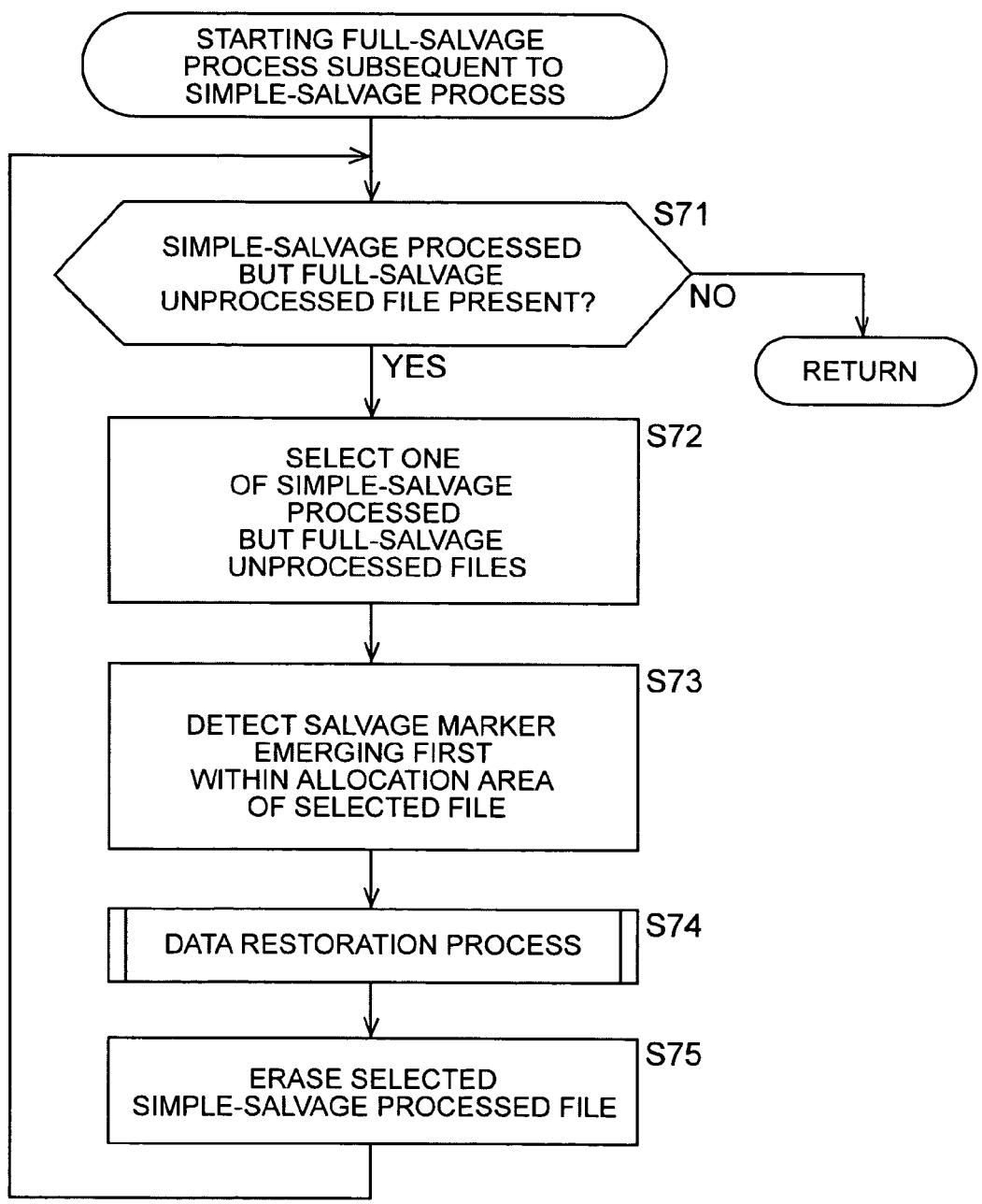
FIG. 22 is a flowchart illustrating another process of FIG. 20.

The full-salvage process in step S47 after the simple-salvage process is described below with reference to a flowchart of FIG. 22. In step S71, the controller 120 acquires the UDF as the file system recorded on the optical disk 111, and determines whether a file tagged with the identification information indicating that the file is simple-salvage processed (namely, a file not full-salvage processed) is present. If it is determined that such a file is present, the controller 120 proceeds to step S72. In step S72, the controller 120 selects one of the files determined to be present in step S71 and tagged with the identification information representing that the file is simple-salvage processed.

The controller 120 detects a salvage marker emerging first within the allocation area of the file selected in step S72 (step S73), and performs a restoration process of the annual ring data contained in the allocation area in the file selected in step S72 (step S74).

Figure 23:
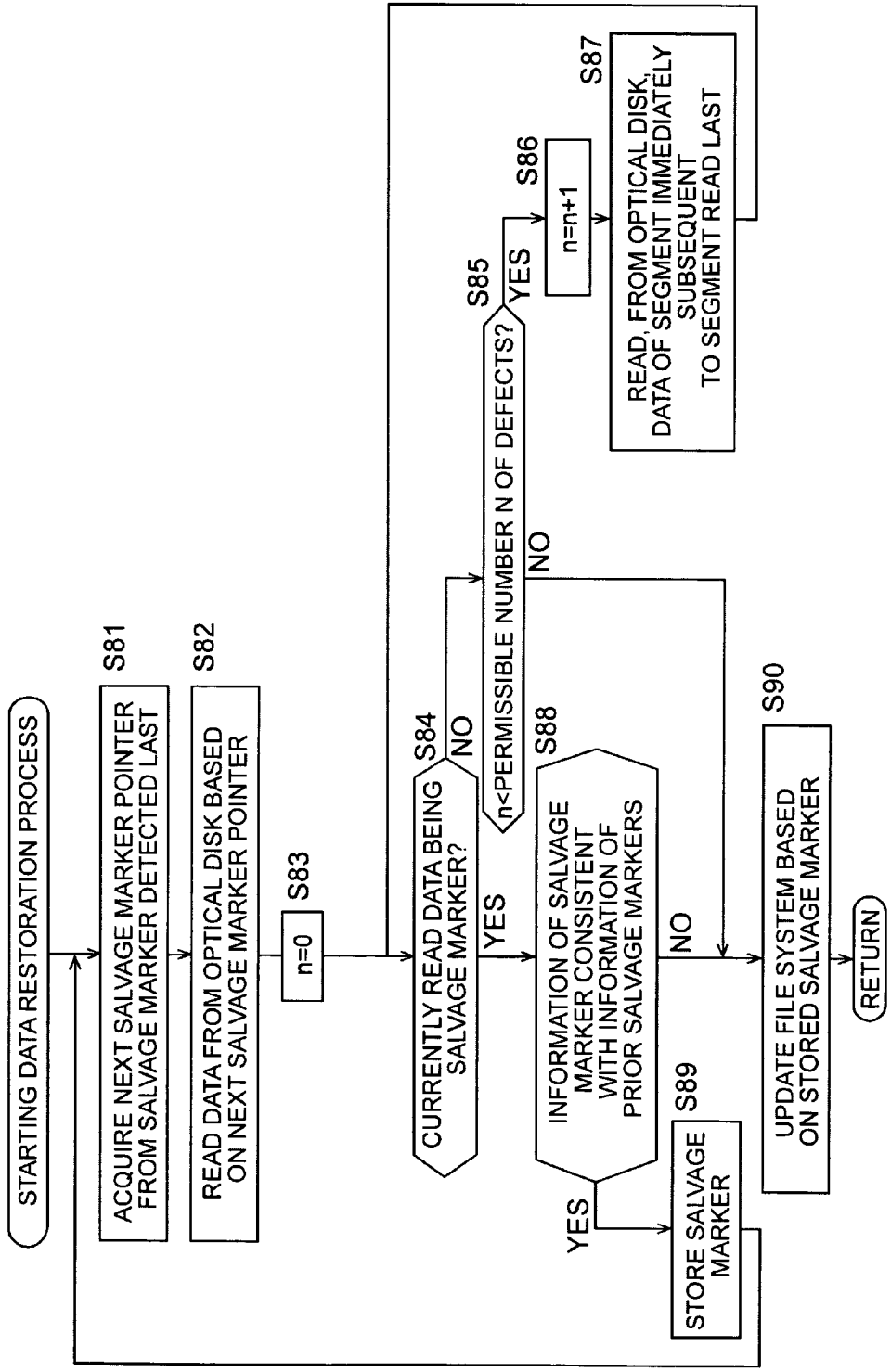
FIG. 23 is a flowchart illustrating one process of FIG. 22.

The process in step S74 is described below with reference to a flowchart of FIG. 23. In step S81, the controller 120 acquires a next salvage marker pointer contained in the salvage marker detected last. At the start of the data restoration process, the controller 120 acquires the next salvage marker pointer contained in the salvage marker detected in step S73 of FIG. 22. In step S82, the controller 120 controls the servo controller 115 based on the next salvage marker pointer acquired in step S81, thereby reading data at a recording position where the next salvage marker is recorded.

In step S83, the controller 120 initializes a variable "n" that is to be incremented by one each time a process in step S86 discussed later is performed. In step S84, the controller 120 determines, based on the presence or absence of a salvage marker ID, whether the data read in step S82 is a salvage marker. If it is determined that the data read in step S82 is not a salvage marker (in other words, if no salvage marker ID is detected), the controller 120 proceeds to step S85.

In step S85, the controller 120 determines whether the variable "n" is smaller than a predetermined permissible number N of defects. If it is determined that the variable "n" is smaller than predetermined permissible number N of defects, the controller 120 proceeds to step S86 to increment the variable "n" by 1. In step S87, the controller 120 controls the servo controller 115, thereby reading a segment of data located immediately subsequent to a segment of data read last from the optical disk 111. The controller 120 returns to step S84 to repeat the process in step S84 and subsequent steps. In step S84, the controller 120 determines whether the data read from the optical disk 111 in step S87 is a salvage marker.

If it is determined in step S85 that the variable "n" is greater than or equal to the predetermined permissible number N of defects, the process proceeds to step S90.

When data is recorded onto the optical disk 111, an area difficult to record data thereon may be created because of a power interruption or the like. In such a case, a next salvage marker pointer recorded beforehand on a salvage marker fails to agree in location with an actual recording position of a next salvage marker. Taking advantages of this, and repeating steps S84-S87, the controller 120 searches for a salvage marker in a predetermined segment subsequent to the next salvage marker pointer (planned recording position of the next salvage marker) acquired in step S81. Even if the planned recording position of the next salvage marker fails to agree with the actual recording position of the next salvage marker, the controller 120 can detects the salvage marker with a high probability.

If the controller 120 determines in step S84 that the data read in step S82 (or step S87) is a salvage marker (i.e., that the read data contains the salvage marker ID), the controller 120 proceeds to step S88.

In step S88, the controller 120 determines whether information contained in the read salvage marker is consistent with information contained in the previously read salvage marker.

The process in step S88 is described below more specifically. The UDF file entries, contained respective salvage markers recorded on the optical disk 111 as the identification information identifying the file are identical to each other. The next salvage marker pointers contained in respective salvage markers follow a predetermined rule between one salvage marker after another in the recording order. For example, the next salvage marker pointers are incremented by one in the recording order. In step S88, the controller 120 determines whether the UDF file entry contained in the salvage marker read in step S82 (or step S87) is identical to the UDF file entry contained in the immediately prior salvage marker read. If it is determined that the two UDF file entries are not identical to each other, the controller 120 determines that the salvage marker read in step S82 (or step S87) is not consistent with the immediately prior salvage marker read.

If it is determined that the UDF file entry contained in the salvage marker read in step S82 (or step S87) is identical to the UDF file entry contained in the immediately prior salvage marker read, the controller 120 determines whether the next salvage marker pointer contained in the salvage marker read in step S82 (or step S87) and the next salvage marker pointer contained in the immediately prior salvage marker read follow the predetermined rule (such as the one step increment rule). If it is determined that the two next salvage marker pointers fail to follow the predetermined rule, the controller 120 determines that the salvage marker read in step S82 (or step S87) is not consistent with the immediately prior read salvage marker.

If it is determined that the next salvage marker pointer contained in the salvage marker read in step S82 (or step S87) and the next salvage marker pointer contained in the immediately prior salvage marker read follow the predetermined rule, the controller 120 determines that the salvage marker read in step S82 (or step S87) is consistent with the immediately prior read salvage marker.

In this way, the controller 120 determines in step S88 whether the salvage marker read in step S82 (or step S87) is consistent with the immediately prior read salvage marker. If it is determined in step S88 that the salvage marker read in step S82 (or step S87) is consistent with the immediately prior read salvage marker, the controller 120 proceeds to step S89.

In step S89, the controller 120 supplies the memory controller 117 with the salvage marker read from the clip directory 11 in step S82 (or step S87) to store the salvage marker in the memory 118. The controller 120 then returns to step S81 to repeat the process in step S81 and subsequent steps. In step S81 repeated subsequent to step S89, the controller 120 acquires a next salvage marker pointer from the salvage marker stored in the memory 118 in step S89.

If it is determined in step S88 that the salvage marker read in step S82 (or step S87) is not consistent with the immediately prior read salvage marker, the controller 120 proceeds to step S90. In step S90, based on the salvage markers stored in the memory 118 in step S89, the controller 120 registers the annual ring data, not constructed in a file as a result of record interruption, as one file in the file system in the optical disk 111 with the recording position thereof associated with the identification information for identifying the file.

By registering the annual ring data as one new file in the file system, the controller 120 can read the annual ring data which would be otherwise unreadable due to incomplete record ending. The data restoration process has been described below.

Returning to FIG. 22, in step S75, the controller 120 deletes the file selected in step S72 from the optical disk 111. More specifically, the controller 120 deletes the identification information and the recording position information, corresponding to the file selected in step S72, from the file system.

The controller 120 returns to step S71 to repeat processes in step S71 and subsequent steps. If it is determined in step S71 that a file tagged with the identification information representing that the file is simple-salvage processed is not present, the full-salvage process after the simple-salvage process completes. The full-salvage process thus completes. In this way, the optical disk 111 becomes the optical disk #2, which is data recordable and playable.

Returning to FIG. 20, if the user decides not to perform the full-salvage process in step S46, the salvage execution determination process ends. Even if the full-salvage process is required, the optical disk 111 becomes an optical disk #1.

If it is determined in step S42 that a closed flag is set in the LVID, the controller 120 proceeds to step S48. In step S48, the controller 120 controls the elements, thereby acquiring the UDF as the file system stored in the optical disk 111, and determining whether a file tagged with identification information representing that the file is simple-salvage processed is present. If it is determined that such a file is present, the controller 120 proceeds to step S46. The process in step S46 and subsequent steps is then performed as previously discussed. Rather than acquiring the UDF from the optical disk 111, the controller 120 can use the UDF acquired in step S41.

In step S48, the referencing of the UDF reveals that no file with the identification information showing that the file is simple-salvage processed is present, the salvage execution determination process ends. The optical disk 111 thus becomes an optical disk #2.

The controller 120 determines in step S43 whether an index ID contained in the backup information stored in the nonvolatile memory 133 matches a unique index ID recorded on the optical disk 111. If it is determined that the two IDs fail to match each other possibly because of a substitute optical disk 111, the controller 120 determines that performing the simple-salvage process on the substitute optical disk 111 is difficult and proceeds to step S49.

Figure 24:
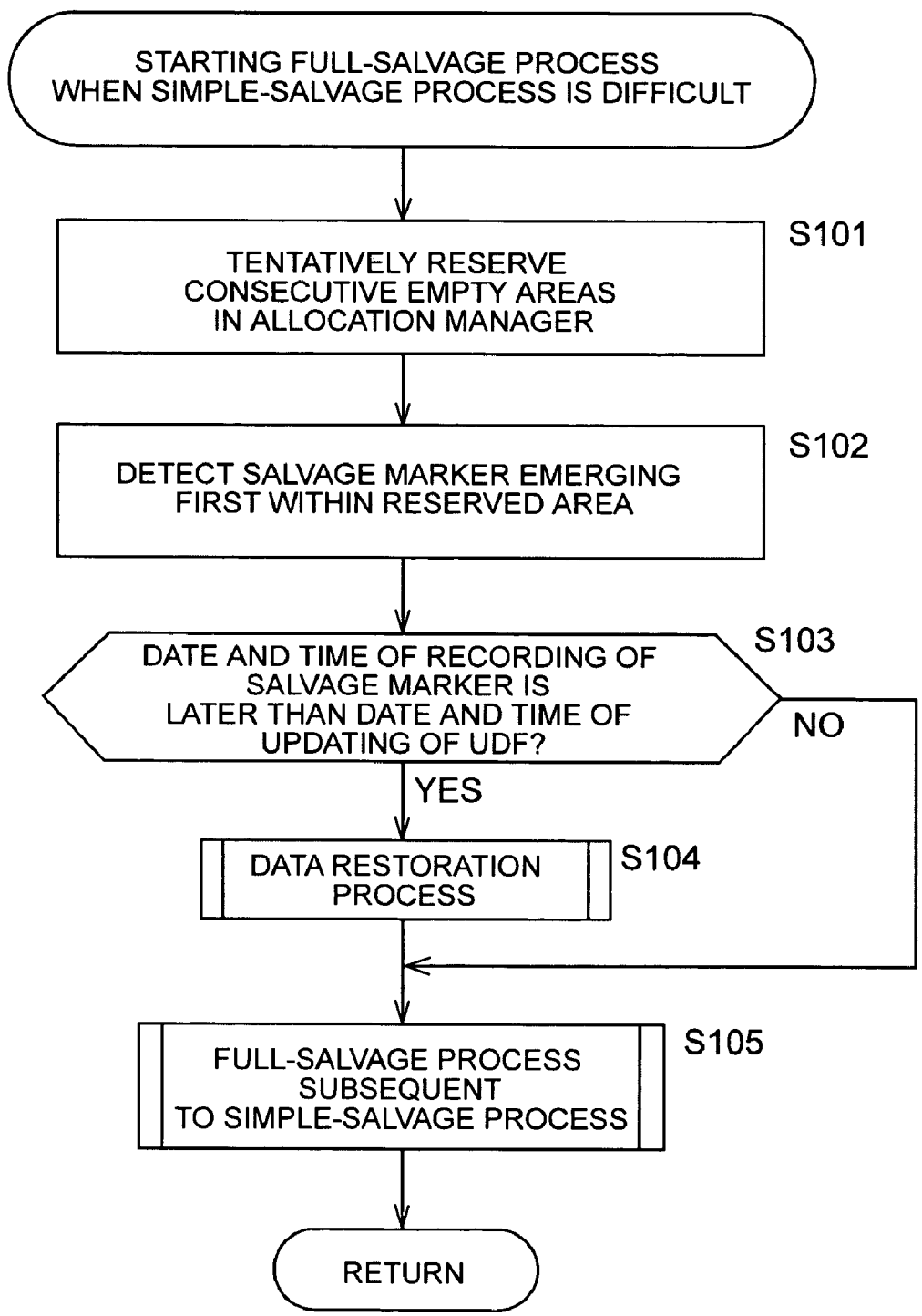
FIG. 24 is a flowchart illustrating another process of FIG. 20.

In step S49, the controller 120 causes the user to decide whether to perform the full-salvage process on a user interface (not shown), and detects the user decision. If the user decides to perform the full-salvage process, the controller 120 proceeds to step S50 where the full-salvage process is performed when the simple-salvage process is difficult. The full-salvage process in step S50 when the simple-salvage process is difficult is described with reference to a flowchart of FIG. 24.

In step S101, the allocation manager 132 reserves consecutive areas where the interrupted record of the annual ring data could be present on the optical disk 111. In step S102, the controller 120 detects a salvage marker emerging first within the area reserved in step S101. In step S103, the controller 120 determines whether the date and time of recording the salvage marker detected in step S102 are later than the date and time of updating of the UDF. The date and time of update of the UDF is recorded in the UDF itself. If it is determined that the date and time of recording the salvage marker detected in step S102 are later than the date and time of updating of the UDF, the UDF of the optical disk 111 is not updated after the recording of the salvage marker. This means that the recording process at the time of the recording of the salvage marker failed to normally complete. The process proceeds to step S104 to perform the data restoration process. The process in step S104 is identical to the process in step S74, and the discussion thereof is omitted here.

A simple-salvage processed file produced in the past may be present on the optical disk 111. In step S105, the full-salvage process after the simple-salvage process discussed with reference to FIG. 22 is performed.

The simple-salvage processed file produced in the past can be present when the full-salvage process was performed after the simple-salvage process discussed with reference to the flowchart of FIG. 22 and then power was interrupted prior to the end of the process in step S75. The simple-salvage processed file produced in the past can be present when power was interrupted in the middle of recording on the optical disk 111 in the state of the optical disk #1 of FIG. 18, the optical disk 111 was unloaded in power off state, another optical disk was loaded and then unloaded in power on state, and the optical disk ill was loaded back.

If it is determined in step S103 that the date and time of recording the salvage marker detected in step S102 is not later than the date and time of update of the UDF, the controller 120 proceeds to step S105 skipping step S104. The full-salvage process when the simple-salvage process is difficult has been discussed.

Returning to FIG. 20, the controller 120 sets a closed flag in the LVID of the read UDF. Using the UDF with the closed flag set in the LVID, the controller 120 updates the UDF recorded on the optical disk 111. The salvage execution determination process thus completes. The optical disk 111 becomes an optical disk #2.

If the user decides not to perform the full-salvage process in step S49, the controller 120 ends the full-salvage process skipping steps S50 and S51. Since neither simple-salvage process nor full-salvage process is performed on the optical disk 111 in this case, the optical disk 111 is in a state at the beginning of the salvage execution determination process.

The recording and reproducing apparatus 100 thus performs the salvage execution determination process. If the data recording process fails to normally complete on the optical disk 111 due to a power interruption or the like, and power is then turned on later, the simple-salvage process is performed. The data recorded until the occurrence of power interruption is protected, and the data recording quickly resumes.

In the above discussion, the audio data A and the video data V are recorded as the annual ring data on the optical disk 111. Data in addition to the audio data A and the video data V can be recorded as the annual ring data on the optical disk 111.

The present invention is applicable not only to the case where the annual ring data is recorded on the optical disk 111 but also to the case where data by file is recorded on the optical disk 111.

In the above discussion of the embodiments, the optical disk 1ll is used as an information recording medium. An information recording medium, other than the optical disk 1ll managing files using the file system, can be used.

The above series of process steps may be performed using hardware, or software, or a combination thereof. If the series of process steps is performed using software, a computer program of process sequence may be installed in a computer, and the function of the recording and reproducing apparatus 100 is performed by causing the computer to perform the program.

The recording and reproducing apparatus 100 includes a central processing unit (CPU). The program for causing the computer to perform the function of the recording and reproducing apparatus 100 may be supplied in the state stored in a magnetic disk, an optical disk, a semiconductor memory, or the like, to the computer, and is then installed onto a hard disk. Before execution, the installed program is loaded onto a random-access memory (RAM) in response to an instruction from the CPU in accordance with a command from a user.

The process steps describing the program stored in the recording medium may or may not be sequentially performed in the time sequence order as stated. The steps may be performed in parallel or separately.

What is claimed is:

1. An apparatus for controlling write means that records data as a file onto an information recording medium while also recording, on the recording medium, a file system that represents a correspondence between identification information identifying the file and a recording position of the file on the information recording medium, the apparatus comprising:
   means for controlling writing to the information recording medium;
   means for holding information representing an area on the information recording medium on which the write means performs a write operation;
   means for determining whether the write means has normally completed the write operation; and
   generation control means for controlling generating a file occupying the area on the information recording medium corresponding to the information held by the holding means if the determining means determines that the write means has failed to normally complete the write operation.

2. The apparatus according to claim 1, wherein the generation control means comprises:
   a generator for generating identification information of the file containing data written onto the area on the information recording medium corresponding to the information held in the holding means if the determining means determines that the write means has failed to normally complete the write operation; and
   a registering unit for registering both the identification information of the file generated by the generator and a recording position on the information recording medium in the file system written on the information recording medium.

3. The apparatus according to claim 1, wherein when power is turned back on with the information recording medium in a loaded state thereof or when the information recording medium is loaded in a power-on state, the determining means determines whether the write means has normally completed the write operation.

4. The apparatus according to claim 1, wherein the determining means determines whether the write means has normally completed the write operation, based on a determination of whether the file system is updated in response to the file that has been written on the information recording medium by the write means.

5. The apparatus according to claim 1, wherein the determining means determines whether the write means has normally completed the write operation, based on a flag that represents whether the record of the data on the file system is closed.

6. The apparatus according to claim 1, further comprising means for reserving a space available in the information recording medium,
   wherein the holding means holds information representing the available space on the information recording medium reserved by the reserving means.

7. The apparatus according to claim 1, wherein the write means writes information for updating the file system in response to a predetermined amount of data each time the predetermined amount of data is written in the available space reserved by the reserving means.

8. A method for controlling write means that records data as a file onto an information recording medium while also recording, on the recording medium, a file system that represents a correspondence between identification information identifying the file and a recording position of the file on the information recording medium, the method comprising the steps of:
   controlling writing to the information recording medium;
   holding information representing an area on the information recording medium on which the write means performs a write operation;
   determining whether the write means has normally completed the write operation; and
   controlling generating a file occupying the area on the information recording medium corresponding to the information held by the holding means if the determining means determines that the write means has failed to normally complete the write operation.

9. A recording medium storing a computer-executable program for controlling write means that records data as a file onto an information recording medium while also recording, on the recording medium, a file system that represents a correspondence between identification information identifying the file and a recording position of the file on the information recording medium, the computer-executable program comprising program codes for performing the steps of:
   controlling writing to the information recording medium;
   holding information representing an area on the information recording medium on which the write means performs a write operation;
   determining whether the write means has normally completed the write operation; and
   controlling generating a file occupying the area on the information recording medium corresponding to the information held by the holding means if the determining means determines that the write means has failed to normally complete the write operation.

10. A computer-executable program, embodied on a non-transitory computer readable medium, for controlling write means that records data as a file onto an information recording medium while also recording, on the recording medium, a file system that represents a correspondence between identification information identifying the file and a recording position of the file on the information recording medium, the computer-executable program comprising program codes for performing the steps of:
   controlling writing to the information recording medium;
   holding information representing an area on the information recording medium on which the write means performs a write operation;
   determining whether the write means has normally completed the write operation; and
   controlling generating a file occupying the area on the information recording medium corresponding to the information held by the holding means if the determining means determines that the write means has failed to normally complete the write operation.

* * * * *